(12) United States Patent
Lu et al.

(10) Patent No.: US 8,346,452 B2
(45) Date of Patent: Jan. 1, 2013

(54) INTEGRATED VEHICLE CONTROL SYSTEM USING DYNAMICALLY DETERMINED VEHICLE CONDITIONS

(75) Inventors: Jianbo Lu, Livonia, MI (US); Jeffrey Rupp, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 684 days.

(21) Appl. No.: 12/536,514

(22) Filed: Aug. 6, 2009

(65) Prior Publication Data

US 2010/0017066 A1 Jan. 21, 2010

Related U.S. Application Data

(62) Division of application No. 11/230,275, filed on Sep. 19, 2005, now Pat. No. 7,590,481.

(51) Int. Cl.
*G06F 19/00* (2006.01)
(52) U.S. Cl. ...................................... 701/70; 296/190.03
(58) Field of Classification Search ............... 701/36–38, 701/41, 45, 70–72, 91; 280/755, 5.502–5.509; 296/190.03; 180/271, 282, 276; 340/440, 340/429, 425.5, 441
See application file for complete search history.

(56) References Cited

U.S. PATENT DOCUMENTS

| | | |
|---|---|---|
| 2,917,126 A | 12/1959 | Phillips |
| 3,604,273 A | 9/1971 | Kwok et al. |
| 3,608,925 A | 9/1971 | Murphy |
| 3,797,893 A | 3/1974 | Burckhardt |
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,294,113 A | 10/1981 | Sprott et al. |
| 4,480,714 A | 11/1984 | Yabuta et al. |
| 4,548,079 A | 10/1985 | Klatt |
| 4,592,565 A | 6/1986 | Eagle |
| 4,597,462 A | 7/1986 | Sano et al. |
| 4,624,476 A | 11/1986 | Tanaka et al. |
| 4,650,212 A | 3/1987 | Yoshimura |
| 4,679,808 A | 7/1987 | Ito et al. |
| 4,690,553 A | 9/1987 | Fukamizu et al. |
| 4,696,489 A | 9/1987 | Fujishiro et al. |
| 4,705,130 A | 11/1987 | Funkunaga et al. |

(Continued)

FOREIGN PATENT DOCUMENTS

DE 36 16 907 11/1987

(Continued)

OTHER PUBLICATIONS

U.S. Appl. No. 10/459,697, filed Jun. 11, 2003, Lu.

(Continued)

*Primary Examiner* — Dalena Tran
(74) *Attorney, Agent, or Firm* — Angela M. Brunetti; Raymond Coppiellie

(57) ABSTRACT

A vehicle includes a control system that is used to control a vehicle system. The control system determines a roll condition in response to a yaw rate sensor and a pitch rate sensor without having to use a roll rate sensor. A relative roll angle, relative pitch angle, global roll angle, and global pitch angle may also be determined. A safety system may be controlled in response to the roll condition, roll angle, or the pitch angles individually or in combination.

23 Claims, 16 Drawing Sheets

U.S. PATENT DOCUMENTS

| | | | |
|---|---|---|---|
| 4,712,807 A | 12/1987 | Kurosawa | |
| 4,761,022 A | 8/1988 | Ohashi | |
| 4,765,649 A | 8/1988 | Ikemoto et al. | |
| 4,767,588 A | 8/1988 | Ito | |
| 4,778,773 A | 10/1988 | Sukegawa | |
| 4,797,823 A | 1/1989 | Ikemoto et al. | |
| 4,809,183 A | 2/1989 | Eckert | |
| 4,827,416 A | 5/1989 | Kawagoe et al. | |
| 4,846,496 A | 7/1989 | Tanaka et al. | |
| 4,872,116 A | 10/1989 | Ito et al. | |
| 4,888,696 A | 12/1989 | Akatsu et al. | |
| 4,898,431 A | 2/1990 | Karnopp et al. | |
| 4,930,082 A | 5/1990 | Harara et al. | |
| 4,951,198 A | 8/1990 | Watanabe et al. | |
| 4,960,292 A | 10/1990 | Sadler | |
| 4,964,679 A | 10/1990 | Rath | |
| 4,967,865 A | 11/1990 | Schindler | |
| 4,976,330 A | 12/1990 | Matsumoto | |
| 4,998,593 A | 3/1991 | Karnopp et al. | |
| 5,002,142 A | 3/1991 | Klosterhaus | |
| 5,033,770 A | 7/1991 | Kamimura et al. | |
| 5,058,017 A | 10/1991 | Adachi et al. | |
| 5,066,041 A | 11/1991 | Kindermann et al. | |
| 5,085,458 A | 2/1992 | Kii et al. | |
| 5,088,040 A | 2/1992 | Matsuda et al. | |
| 5,089,967 A | 2/1992 | Haseda et al. | |
| 5,097,917 A | 3/1992 | Serizawa et al. | |
| 5,159,553 A | 10/1992 | Karnopp et al. | |
| 5,163,319 A | 11/1992 | Spies et al. | |
| 5,189,920 A | 3/1993 | Martinez | |
| 5,200,896 A | 4/1993 | Sato et al. | |
| 5,208,749 A | 5/1993 | Adachi et al. | |
| 5,217,248 A | 6/1993 | Reast | |
| 5,224,765 A | 7/1993 | Matsuda | |
| 5,228,757 A | 7/1993 | Ito et al. | |
| 5,230,396 A | 7/1993 | Yasui | |
| 5,239,868 A | 8/1993 | Takenaka et al. | |
| 5,247,466 A | 9/1993 | Shimada et al. | |
| 5,261,503 A | 11/1993 | Yasui | |
| 5,265,020 A | 11/1993 | Nakayama | |
| 5,274,576 A | 12/1993 | Williams | |
| 5,278,761 A | 1/1994 | Ander et al. | |
| 5,282,134 A | 1/1994 | Gioutsos et al. | |
| 5,297,646 A | 3/1994 | Yamamura et al. | |
| 5,307,274 A | 4/1994 | Takata et al. | |
| 5,311,431 A | 5/1994 | Cao et al. | |
| 5,311,956 A | 5/1994 | Sugiyama | |
| 5,324,102 A | 6/1994 | Roll et al. | |
| 5,335,176 A | 8/1994 | Nakamura | |
| 5,349,531 A * | 9/1994 | Sato et al. | 701/470 |
| 5,365,439 A | 11/1994 | Momose et al. | |
| 5,370,199 A | 12/1994 | Akuta et al. | |
| 5,408,411 A | 4/1995 | Nakamura et al. | |
| 5,438,515 A | 8/1995 | Miichi et al. | |
| 5,446,658 A | 8/1995 | Pastor et al. | |
| 5,455,770 A | 10/1995 | Hadeler et al. | |
| 5,490,063 A | 2/1996 | Genise | |
| 5,510,989 A | 4/1996 | Zabler et al. | |
| 5,515,277 A | 5/1996 | Mine | |
| 5,548,536 A | 8/1996 | Ammon | |
| 5,549,328 A | 8/1996 | Cubalchini | |
| 5,560,688 A | 10/1996 | Schappler et al. | |
| 5,576,957 A | 11/1996 | Asanuma et al. | |
| 5,579,245 A | 11/1996 | Kato | |
| 5,598,335 A | 1/1997 | You | |
| 5,602,734 A | 2/1997 | Kithil | |
| 5,610,575 A | 3/1997 | Gioutsos | |
| 5,627,756 A | 5/1997 | Fukada et al. | |
| 5,634,698 A | 6/1997 | Cao et al. | |
| 5,640,324 A | 6/1997 | Inagaki | |
| 5,648,903 A | 7/1997 | Liubakka | |
| 5,671,982 A | 9/1997 | Wanke | |
| 5,676,433 A | 10/1997 | Inagaki et al. | |
| 5,684,702 A | 11/1997 | Phillips et al. | |
| 5,694,319 A | 12/1997 | Suissa et al. | |
| 5,703,776 A | 12/1997 | Soung | |
| 5,707,117 A | 1/1998 | Hu et al. | |
| 5,707,120 A | 1/1998 | Monzaki et al. | |
| 5,719,790 A | 2/1998 | Lahrenz et al. | |
| 5,720,533 A | 2/1998 | Pastor et al. | |
| 5,722,743 A | 3/1998 | Sano | |
| 5,723,782 A | 3/1998 | Bolles, Jr. | |
| 5,732,377 A | 3/1998 | Eckert | |
| 5,732,378 A | 3/1998 | Eckert et al. | |
| 5,732,379 A | 3/1998 | Eckert et al. | |
| 5,736,939 A | 4/1998 | Corcoran | |
| 5,737,224 A | 4/1998 | Jeenicke et al. | |
| 5,740,041 A | 4/1998 | Iyoda | |
| 5,740,877 A | 4/1998 | Sasaki | |
| 5,742,918 A | 4/1998 | Ashrafi et al. | |
| 5,742,919 A | 4/1998 | Ashrafi et al. | |
| 5,762,406 A | 6/1998 | Yasui et al. | |
| 5,774,819 A | 6/1998 | Yamamoto et al. | |
| 5,782,543 A | 7/1998 | Monzaki et al. | |
| 5,787,375 A | 7/1998 | Madau et al. | |
| 5,797,663 A | 8/1998 | Kawaguchi et al. | |
| 5,801,647 A | 9/1998 | Survo et al. | |
| 5,809,434 A | 9/1998 | Ashrafi et al. | |
| 5,816,670 A | 10/1998 | Yamada et al. | |
| 5,825,284 A | 10/1998 | Dunwoody et al. | |
| 5,842,143 A | 11/1998 | Lohrenz et al. | |
| 5,857,160 A | 1/1999 | Dickinson et al. | |
| 5,857,535 A | 1/1999 | Brooks | |
| 5,869,943 A | 2/1999 | Nakashima et al. | |
| 5,878,357 A | 3/1999 | Sivashankar et al. | |
| 5,890,084 A | 3/1999 | Halasz et al. | |
| 5,893,896 A | 4/1999 | Imamura et al. | |
| 5,925,083 A | 7/1999 | Ackermann | |
| 5,926,087 A | 7/1999 | Busch | |
| 5,931,546 A | 8/1999 | Nakashima et al. | |
| 5,931,887 A | 8/1999 | Hac | |
| 5,935,181 A | 8/1999 | Iwasaki | |
| 5,941,920 A | 8/1999 | Schubert | |
| 5,944,137 A | 8/1999 | Moser et al. | |
| 5,944,392 A | 8/1999 | Tachihata et al. | |
| 5,946,644 A | 8/1999 | Cowan et al. | |
| 5,948,028 A | 9/1999 | Raad et al. | |
| 5,964,819 A | 10/1999 | Naito | |
| 5,965,808 A | 10/1999 | Normann | |
| 5,971,503 A | 10/1999 | Joyce et al. | |
| 6,002,974 A | 12/1999 | Schiffman | |
| 6,002,975 A | 12/1999 | Schiffman et al. | |
| 6,026,926 A | 2/2000 | Noro et al. | |
| 6,038,495 A | 3/2000 | Schiffman | |
| 6,040,916 A | 3/2000 | Griesinger | |
| 6,050,360 A | 4/2000 | Pattok et al. | |
| 6,055,472 A | 4/2000 | Breunig et al. | |
| 6,062,336 A | 5/2000 | Amberkar et al. | |
| 6,065,558 A | 5/2000 | Wielenga | |
| 6,073,065 A | 6/2000 | Brown et al. | |
| 6,079,513 A | 6/2000 | Nishizaki et al. | |
| 6,081,761 A | 6/2000 | Harada et al. | |
| 6,085,133 A | 7/2000 | Keuper et al. | |
| 6,085,860 A | 7/2000 | Hackl et al. | |
| 6,086,168 A | 7/2000 | Rump | |
| 6,089,344 A | 7/2000 | Baughn et al. | |
| 6,104,284 A | 8/2000 | Otsuka | |
| 6,121,873 A | 9/2000 | Yamada et al. | |
| 6,122,568 A | 9/2000 | Madau et al. | |
| 6,122,584 A | 9/2000 | Lin et al. | |
| 6,129,172 A | 10/2000 | Yoshida | |
| 6,141,604 A | 10/2000 | Mattes et al. | |
| 6,141,605 A | 10/2000 | Joyce | |
| 6,144,904 A | 11/2000 | Tseng | |
| 6,149,251 A | 11/2000 | Wuerth et al. | |
| 6,161,905 A | 12/2000 | Hac et al. | |
| 6,167,357 A | 12/2000 | Zhu | |
| 6,169,939 B1 | 1/2001 | Raad et al. | |
| 6,169,946 B1 | 1/2001 | Griessbach | |
| 6,170,594 B1 | 1/2001 | Gilbert | |
| 6,176,555 B1 | 1/2001 | Semsey | |
| 6,178,365 B1 | 1/2001 | Kawagoe et al. | |
| 6,178,375 B1 | 1/2001 | Breunig | |
| 6,179,310 B1 | 1/2001 | Clare et al. | |
| 6,179,394 B1 | 1/2001 | Browalski et al. | |
| 6,184,637 B1 | 2/2001 | Yamawaki et al. | |
| 6,185,485 B1 | 2/2001 | Ashrafti et al. | |

| | | |
|---|---|---|
| 6,185,497 B1 | 2/2001 | Taniguchi et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,227,482 B1 | 5/2001 | Yamamoto |
| 6,232,875 B1 | 5/2001 | DeZorzi |
| 6,233,510 B1 | 5/2001 | Platner et al. |
| 6,236,916 B1 | 5/2001 | Staub et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,290,019 B1 | 9/2001 | Kolassa et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,445 B2 | 11/2001 | Tozu et al. |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B2 | 1/2002 | Brown et al. |
| 6,349,247 B1 | 2/2002 | Schramm et al. |
| 6,351,694 B1 | 2/2002 | Tseng et al. |
| 6,352,318 B1 | 3/2002 | Hosomi et al. |
| 6,356,188 B1 | 3/2002 | Meyers et al. |
| 6,360,147 B1 | 3/2002 | Lee |
| 6,363,309 B1 | 3/2002 | Irie et al. |
| 6,366,844 B1 | 4/2002 | Woywod et al. |
| 6,370,938 B1 | 4/2002 | Leimbach et al. |
| 6,394,240 B1 | 5/2002 | Barwick |
| 6,397,127 B1 | 5/2002 | Meyers et al. |
| 6,409,286 B1 | 6/2002 | Fennel |
| 6,419,240 B1 | 7/2002 | Burdock et al. |
| 6,424,897 B1 | 7/2002 | Mattes et al. |
| 6,427,102 B1 | 7/2002 | Ding |
| 6,428,118 B1 | 8/2002 | Blosch |
| 6,433,681 B1 | 8/2002 | Foo et al. |
| 6,438,463 B1 | 8/2002 | Tobaru et al. |
| 6,438,464 B1 | 8/2002 | Woywod et al. |
| 6,456,194 B1 | 9/2002 | Carlson et al. |
| 6,459,990 B1 | 10/2002 | McCall et al. |
| 6,471,218 B1 | 10/2002 | Burdock et al. |
| 6,477,480 B1 | 11/2002 | Tseng et al. |
| 6,491,353 B2 | 12/2002 | Hackl |
| 6,496,758 B2 | 12/2002 | Rhode et al. |
| 6,496,763 B2 | 12/2002 | Griessbach |
| 6,498,976 B1 | 12/2002 | Ehlbeck et al. |
| 6,502,023 B1 | 12/2002 | Fukada |
| 6,523,637 B1 | 2/2003 | Nakano et al. |
| 6,526,342 B1 | 2/2003 | Burdock et al. |
| 6,529,803 B2 | 3/2003 | Meyers et al. |
| 6,529,811 B2 | 3/2003 | Watson et al. |
| 6,542,073 B2 | 4/2003 | Yeh et al. |
| 6,542,792 B2 | 4/2003 | Schubert et al. |
| 6,547,022 B2 | 4/2003 | Hosomi et al. |
| 6,547,343 B1 | 4/2003 | Hac |
| 6,553,284 B2 | 4/2003 | Holst et al. |
| 6,554,293 B1 | 4/2003 | Fennel et al. |
| 6,556,908 B1 | 4/2003 | Lu et al. |
| 6,559,634 B2 | 5/2003 | Yamada |
| 6,593,849 B2 | 7/2003 | Chubb |
| 6,598,946 B2 | 7/2003 | Nagae |
| 6,600,414 B2 | 7/2003 | Foo et al. |
| 6,600,985 B2 | 7/2003 | Weaver |
| 6,618,656 B2 | 9/2003 | Kueblbeck et al. |
| 6,631,317 B2 | 10/2003 | Lu |
| 6,637,543 B2 | 10/2003 | Card |
| 6,644,454 B2 | 11/2003 | Yamada et al. |
| 6,650,971 B2 | 11/2003 | Haas |
| 6,654,674 B2 | 11/2003 | Lu et al. |
| 6,657,539 B2 | 12/2003 | Yamamoto et al. |
| 6,671,595 B2 | 12/2003 | Lu et al. |
| 6,678,631 B2 | 1/2004 | Schiffmann |
| 6,681,196 B2 | 1/2004 | Glaser et al. |
| 6,681,881 B2 | 1/2004 | Andonian et al. |
| 6,684,140 B2 | 1/2004 | Lu |
| 6,698,542 B2 | 3/2004 | Nishizaki et al. |
| 6,704,631 B2 | 3/2004 | Winner et al. |
| 6,718,248 B2 | 4/2004 | Lu |
| 6,719,087 B2 | 4/2004 | Demerly |
| 6,725,140 B2 | 4/2004 | Lu et al. |
| 6,741,922 B2 | 5/2004 | Holler |
| 6,745,624 B2 | 6/2004 | Porter |
| 6,747,553 B2 | 6/2004 | Yamada et al. |
| 6,756,890 B1 | 6/2004 | Schramm et al. |
| 6,766,875 B2 | 7/2004 | Yamamoto |
| 6,784,794 B1 | 8/2004 | McQuade |
| 6,799,092 B2 | 9/2004 | Lu |
| 6,816,764 B2 | 11/2004 | Coelingh et al. |
| 6,834,218 B2 | 12/2004 | Meyers et al. |
| 6,856,868 B1 | 2/2005 | Le et al. |
| 6,873,897 B2 | 3/2005 | Faye et al. |
| 7,239,952 B2 | 7/2007 | Bauer |
| 7,369,927 B2 | 5/2008 | Hille et al. |
| 7,522,985 B2 * | 4/2009 | Fiedler et al. .................. 701/70 |
| 2002/0109310 A1 | 8/2002 | Lim |
| 2003/0055549 A1 | 3/2003 | Barta et al. |
| 2003/0100979 A1 | 5/2003 | Lu et al. |
| 2003/0109939 A1 | 6/2003 | Burgdorf et al. |
| 2003/0171865 A1 | 9/2003 | Moser |
| 2003/0182025 A1 | 9/2003 | Tseng et al. |
| 2004/0010383 A1 | 1/2004 | Lu |
| 2004/0019418 A1 | 1/2004 | Lu |
| 2004/0026158 A1 | 2/2004 | Rieth et al. |
| 2004/0064246 A1 | 4/2004 | Lu |
| 2004/0119335 A1 | 6/2004 | Szabo et al. |
| 2004/0158368 A1 | 8/2004 | Haas |
| 2004/0217647 A1 | 11/2004 | Einig |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 42 28 893 | 3/1994 |
| DE | 43 35 979 | 4/1995 |
| DE | 43 42 732 | 6/1995 |
| DE | 199 07 633 | 10/1999 |
| DE | 10360728 A1 | 7/2005 |
| EP | 0 430 813 | 12/1993 |
| EP | 0 662 601 | 7/1995 |
| EP | 0 758 601 | 2/1997 |
| EP | 1 046 571 | 4/2000 |
| EP | 1 197 409 | 9/2001 |
| EP | 1479581 A1 | 11/2004 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |

| | | |
|---|---|---|
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| JP | 11321603 | 11/1999 |
| SU | 816849 | 3/1981 |
| WO | WO 02/20318 | 3/2002 |

OTHER PUBLICATIONS

U.S. Appl. No. 10/849,590, filed May 20, 2004, Brown.

A method for reducing on-road rollovers-anti-rollover braking, Thomas J. Wielenga, Dynamotive, LLC, International Congress and Exposition, Detroit, Michigan, Mar. 1-4, 1999.

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

Chen, Bo-Chivan, Peng, Huei; "A Real-time Rollover Threat Index for Sports Utility Vehicles", Proceedings of the American Control Conference, San Diego, CA Jun. 1999.

* cited by examiner

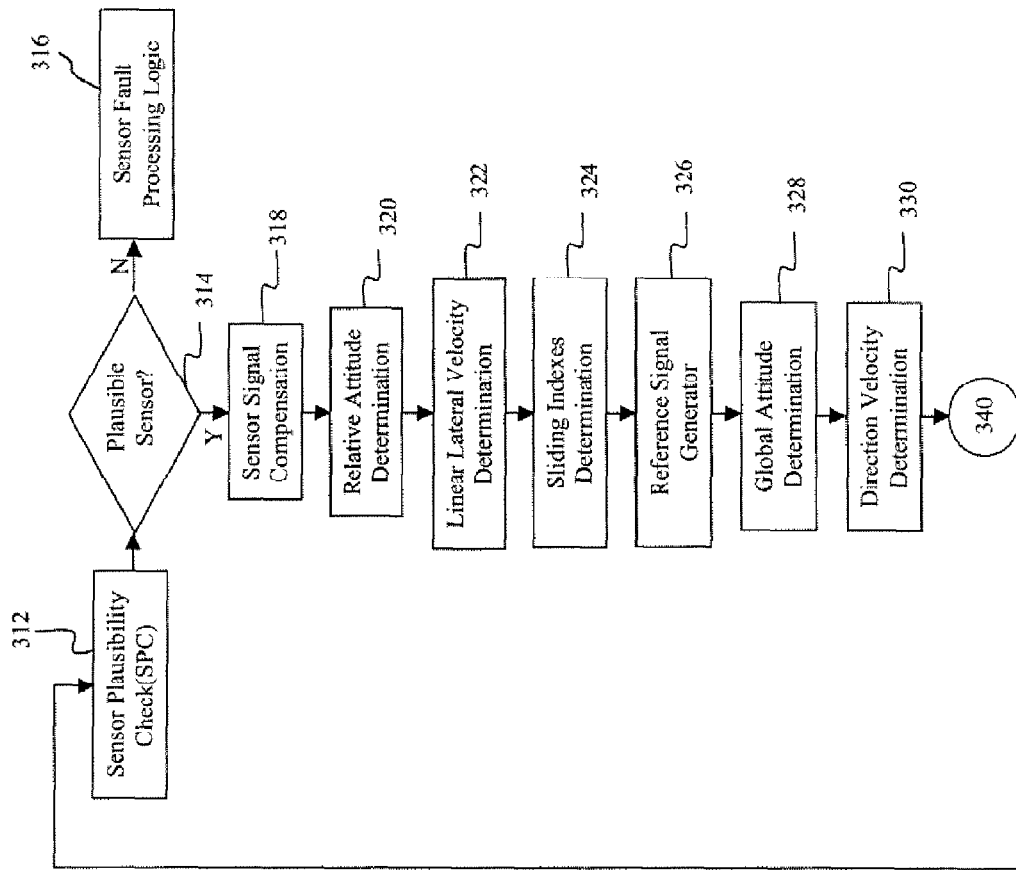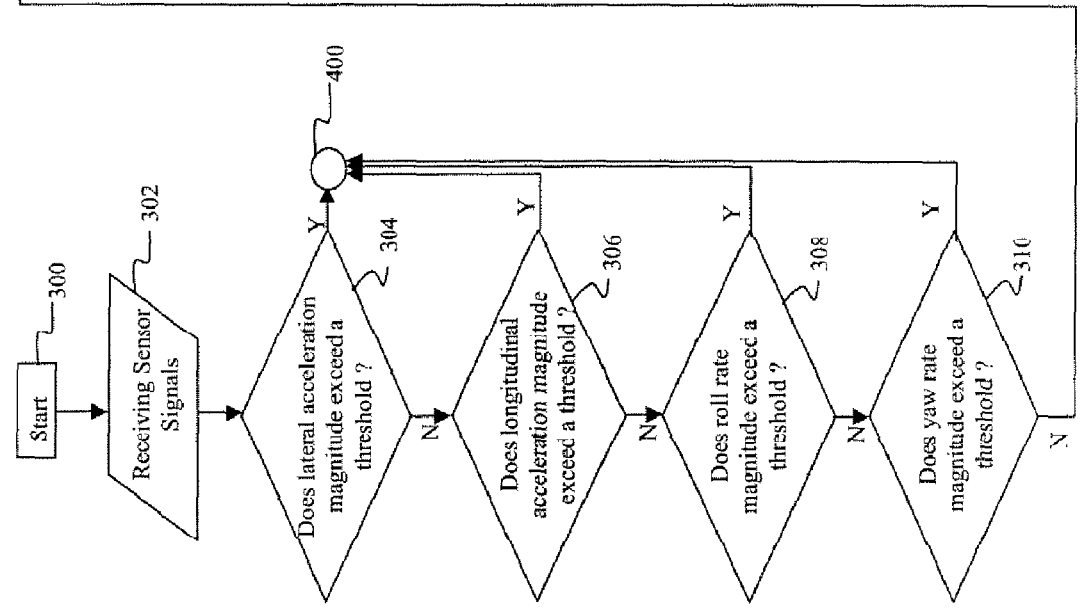
FIG. 13

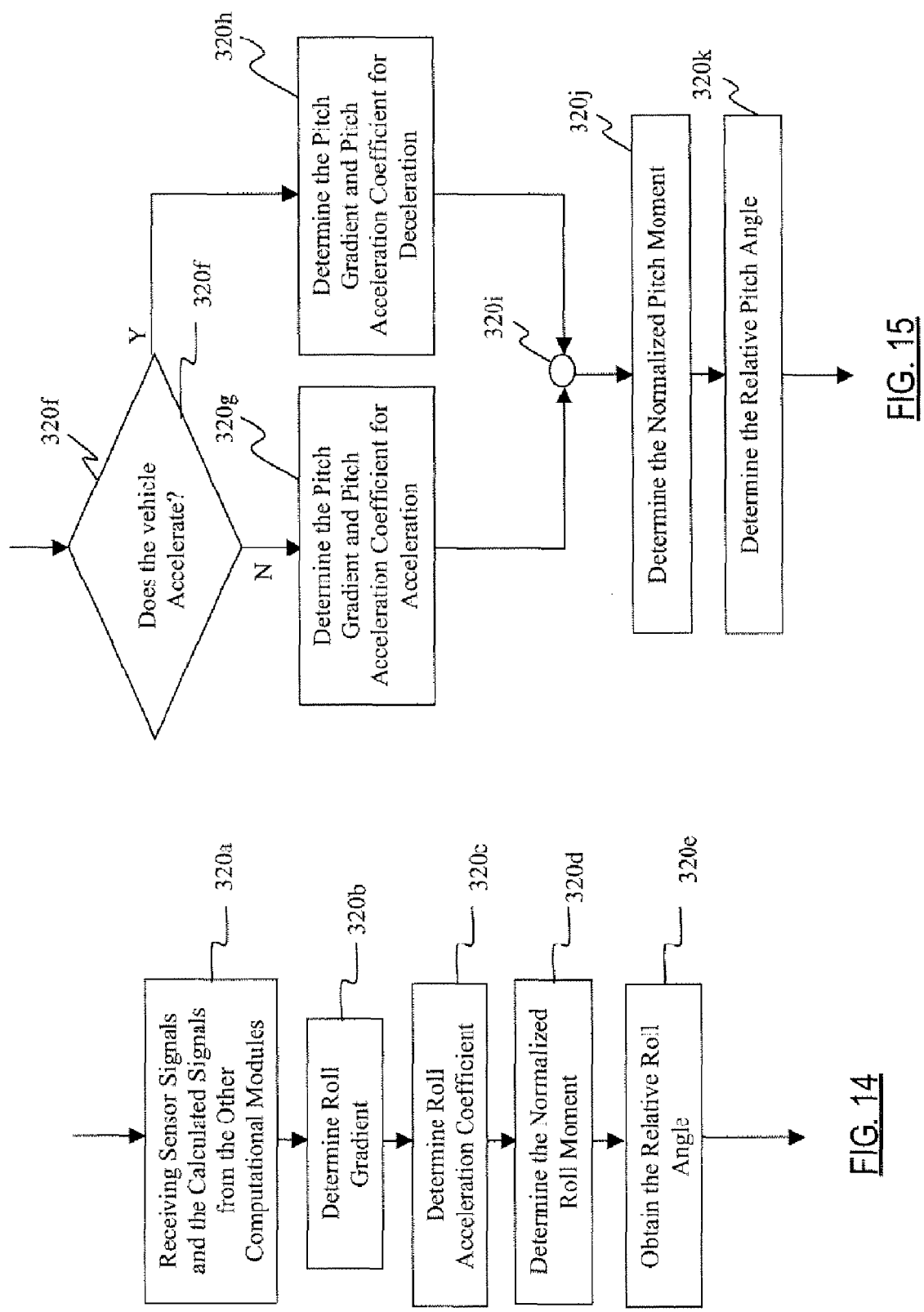

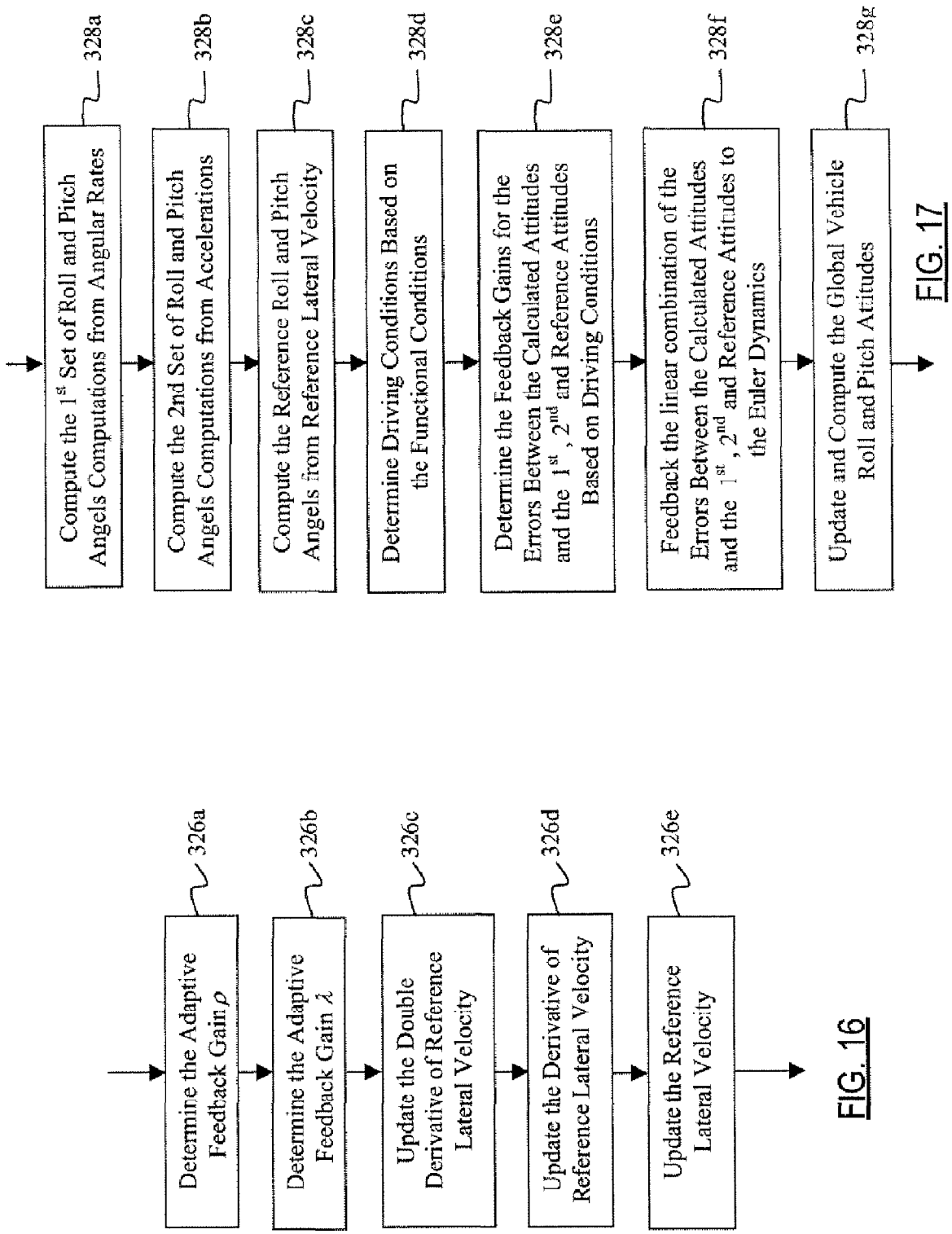

INTEGRATED VEHICLE CONTROL SYSTEM USING DYNAMICALLY DETERMINED VEHICLE CONDITIONS

CROSS REFERENCE

This application is a divisional of co-pending U.S. application Ser. No. 11/230,275 filed on Sep. 19, 2005, now U.S. Pat. No. 7,590,481 herein incorporated by reference.

TECHNICAL FIELD

The present invention relates generally to a control apparatus for controlling an automotive vehicle in response to sensed dynamic behavior, and more specifically, to a method and apparatus for determining various conditions of the vehicle in real time and controlling individual or multiple vehicle control systems based on these conditions.

BACKGROUND

The vehicle control systems for automotives have increased significantly recently. They include the following vehicle dynamics control or active safety systems such as ESC (yaw stability control), RSC (roll stability control), ACC (adaptive cruise control), HD/A/HC (hill decent/ascent/hold control), ABS (anti-lock brake system), EBD (electronic brake distribution), TCS (traction control system), suspension control systems, steering controls, drive-train controls, engine controls, etc. Many of these systems activate available actuators in response to the sensed vehicle and drive conditions so as to augment the driver's driving capability and to improve the driving comfort and to prevent accidents from happening.

Both OEMs (original equipment manufacturers) and the auto suppliers are involved in the development and implementation of such vehicle dynamics control systems. The OEMs mainly focus on system level performance and on how to interact with or supervise various systems supplied by the auto suppliers. The OEMs may need a vehicle system level ECU (electronic control unit) separate from the suppliers' ECUs to conduct such an interaction and supervision. Hence it is the OEM's job to coordinate different functions residing in different ECUs so as to guarantee that all the suppliers' ECUs work seamlessly together to achieve favorable vehicle system level performance. The auto suppliers mainly focus on developing individual control functions residing on their corresponding ECUs.

With current advances in mechatronics, the afore-mentioned control systems are being designed to achieve unprecedented performance, which before were only deemed suitable for spacecraft and aircraft. For example, the gyro sensors widely used in aircraft have now been used for achieving better and new control functions; the anti-lock brake system once invented for airplanes has now become a standard commodity for automotives and its capability is still unlocking due to the better discrimination of the vehicle operating states. The current cost reduction trend in hardware technology is opening room for the addition of more sensors and more actuators to be used in developing new functions and in achieving better vehicle dynamics and safety controls. Although auto suppliers are playing important roles here, occasionally, OEMs may also be involved in this area.

Besides the aforementioned ECU integration and development of new functions, function integration is receiving more and more attention. A function integration is also important due to the increasing usage of multiple actuators and the fact that many of the actuators can affect multiple control functions. That is, there are operational overlaps such that multiple actuators could affect the same type of control functions specified for certain vehicle dynamics (for example, both ESC and RSC can alter the vehicle oversteer). It is desirable to coordinate the different control functions so as to achieve the optimized system level performance and eliminate potential performance conflicting operations. One of the key enablers for coordinating multiple control functions is that the vehicle dynamics conditions used in individual control functions are determined based on the sensors in an integration sense. This can apparently be achieved if all the sensors used in measuring the various vehicle system states are all utilized simultaneously and certain new types of motion sensors are introduced for further vehicle dynamics discrimination. Such a sensing technology is called an Integrated Sensing System in this invention. Typical vehicle dynamics states required by multiple vehicle control systems include the variables characterizing the three-dimensional motions of a vehicle and the variables characterizing the control functions controlling such three-dimensional vehicle dynamics.

In an ESC and a RSC system, the control task involves three-dimensional motions along the vehicle roll and yaw angular directions, and its longitudinal and lateral directions. The coupling between different motion directions in those two systems may not be as strong as in an aircraft or a spacecraft. However they cannot be neglected in real time determination of vehicle operation states and in most of the maneuvers. For example, the excessive steering of a vehicle will lead to an excessive yaw and lateral motion, which further introduces large roll motion of the vehicle body towards the outside of the turn. If a driver brakes the vehicle during the excessive steering, the vehicle body will also have pitch and deceleration motions in addition to the roll, yaw and lateral motions. Hence, a successful control system must involve an accurate determination of the vehicle body attitudes due to the dynamic maneuvers. Such attitudes are of a relative feature, that is, they start to be computed when aggressive steering starts. The attitudes are called relative attitudes.

Notice that there are two types of relative attitudes. One is solely due to the suspension motion, which is a good indication of the relative displacement between the vehicle body and the axles of the wheels. Such relative attitudes are called the chassis relative attitudes. The other relative attitudes are due to the angular difference between the vehicle body and the average road surface determined by the four tire-road contact patches. Such relative attitudes are called the vehicle body-to-road relative attitudes. Notice also that when the four wheels are contacting the road, the body-to-road relative attitudes are the same as the chassis relative attitudes. When there is at least one wheel up in the air such as in a rollover event, the magnitudes of the body-to-road relative attitudes are greater than the magnitudes of the chassis relative attitudes.

The vehicle angular motion such as roll, pitch and yaw can be measured through the gyro sensors such as roll rate, pitch rate and yaw rate sensors. However, the measurements of all those angular rates are of an absolute nature, i.e., they are all measured with respect to the sea level. Hence a continuous computation of the vehicle attitudes based on the three angular rate sensors can only provide vehicle attitudes with respect to the sea level. Such vehicle attitudes are called global attitudes.

The vehicle global attitudes may be used to capture the road profiles such as road bank and slope. For example, if a vehicle is driven on a three-dimensional road surface, the difference between the global attitudes calculated from angular rate sensors and the maneuver-induced relative attitudes can be well used to define the road bank and inclination experienced by the vehicle. If the road surface is flat and the vehicle is in a steady state driving condition, then the vehicle global attitudes are the same as the road bank and inclination.

One reason to distinguish the aforementioned relative and global attitudes is that vehicles are usually driven on a three-dimensional road surface of different terrains, not always on a flat road surface. For example, driving on a road surface with a large road bank increases the roll attitude of a vehicle, hence increasing the rollover tendency of the vehicle. That is, a very large global roll attitude may well imply an uncontrollable rollover event regardless of the flat road driving and the three-dimensional road driving. However, driving on a three-dimensional road with moderate road bank angle, the global roll attitude may not be able to provide enough fidelity for determining a rollover event. Vehicular rollover happens when one side of the vehicle is lifted from the road surface with a long duration of time without returning back. If a vehicle is driven on a banked road, the global attitude sensing will pick up certain attitude information even when the vehicle does not experience any wheel lifting (four wheels are always contacting the road surface). Hence a measure of the relative angular displacement of body-to-road relative attitudes provides more fidelity than global roll attitude in detection of a potential rollover event.

Another need for relative attitudes is for yaw stability control. The sideslip angle of the vehicle is a relative yaw angle with respect to the vehicle path. Sideslip angle has a profound impact on vehicle yaw control performance. Since the lateral and longitudinal tire forces are all generated on the planes of the tire-road contact patches, Newton's law must balance the total forces on an average road plane, which is an average indication of the four tire-road contact patches. The frame, which is fixed on the average road surface defined by the four tire contact patches but moves with the vehicle, is called a road frame. Transforming the sensor signals from the sensor frame mounted and fixed on the vehicle body to the road frame requires the knowledge of the relative attitudes between the road frame and the vehicle body frame, and between the vehicle body frame and the sensor frame.

Other than the relative and global attitudes, there is another vehicle body attitude that corresponds to the road unevenness due to potholes and bumps. Such road unevenness induced vehicle body attitudes are of a vibrational nature. That is, they are usually in high frequency and need to be attenuated through either passive or the controlled suspensions. Those attitudes may be called the vehicle vibration attitudes.

Besides the aforementioned vehicle body relative and global attitudes, the vehicle body translation motions are also of significance in achieving vehicle controls. The vehicle's lateral sliding motion usually increases the vehicle dynamically-unstable tendency and makes the vehicle hard to control by ordinary drivers. Hence one of the performance requirements in vehicle dynamics controls is to attenuate the vehicle's lateral sliding motion as much as possible. Notice that such a performance requirement is different from car racing, where vehicle sliding motion is sacrificed for speed. One of the reasons is that the race car drivers are capable and experienced drivers, who can handle the vehicle well even if it is experiencing a large lateral sliding motion. The vehicle's lateral control variable is characterized by its lateral velocity defined along the lateral direction of the vehicle body. Such a velocity cannot be directly measured and it is usually determined from the lateral accelerometer measurement. The output of the lateral accelerometer is also related to the variables other than the lateral velocity, which includes both gravity and centripetal accelerations. On a banked road, gravity contributes to the lateral accelerometer measurement in addition to the vehicle's true lateral sliding acceleration and centripetal acceleration. Due to the fact that the gravity is fixed in both its magnitude and its direction with respect to the sea level, the vehicle global attitudes can be used to find the relative position between the gravity vector and the vehicle body directions. For this reason, the vehicle global attitudes are used to compensate the gravity influence in the measured lateral acceleration such that the vehicle lateral velocity due to pure lateral sliding can be isolated and determined.

The vehicle's longitudinal motion can be controlled by the brake and drivetrain controls. It can be captured through the wheel speed sensors, which measure the rotational rates of the four wheels. When the wheels' rolling radii are known and the wheel or wheels are free rolling, the vehicle longitudinal velocity can be accurately determined through wheel speed sensor signals. During brake actuation or driving torque applying, the wheel or wheels are likely to deviate from the free rolling state. Therefore, the wheel speed sensors alone cannot provide accurate vehicle longitudinal speed information. The gravity-compensated (through the vehicle's global pitch attitude) longitudinal acceleration sensor signals can be used together with the wheel speed sensor to obtain an accurate and robust vehicle longitudinal velocity.

With the aforementioned needs, it is apparent that additional sensor elements to the current sensor set used in current vehicle stability controls may be required.

In an ESC system, a CMS (centralized motion sensor) cluster mounted on a centralized place located within the vehicle body is used. Such a CMS cluster includes a lateral (and/or longitudinal) accelerometer and a yaw rate sensor and ESC uses such a CMS cluster together with certain DS (decentralized sensor) elements at the other locations such as the wheel speed sensors and the steering wheel angle sensor.

The roll stability control system (short to RSC) offered in vehicles from Ford Motor Company, uses a CMS cluster that adds an additional roll rate sensor to the ESC CMS cluster. The roll rate sensor is used in order to discriminate the roll motion of the vehicle body so as to control the potential rollover of a vehicle.

In the current invention, variations of the CMS cluster are used. Such a centralized motion sensor cluster could contain less than six, six, or greater than six inertial sensor elements.

Hence it is desirable to design a centralized integrated sensing system which uses the aforementioned centralized motion sensor cluster, the decentralized sensor group including other discrete sensor units, the actuator specific sensor units, etc., to determine dynamics states including various types of attitudes, the directional velocities, various forces and torques applied to the vehicle, driving conditions such as the road profile and vehicle loadings, etc. Various variables calculated in such centralized integrated sensing system are provided to various individual ECUs and to the system level ECU, or to the different partitions within an ECU in an integration sense for achieving a refined and optimized system level vehicle control performance. Such centralized integrated sensing system could reside within a system level ECU called IVC ECU (integrated vehicle control ECU) or could also reside in one of the supplier's subsystem ECUs.

Besides being used in vehicle dynamics controls, the aforementioned integrated sensing system may be used for active safety and passive safety systems. Many vehicles such as sport utility vehicles and light trucks equipped with the aforementioned vehicle dynamic controls for accident prevention are also equipped with other injury prevention features such as advanced occupant protection systems including various airbag systems and side curtains, crash mitigation system, pre-crash sensing systems, motorized seatbelt pretensioners, dynamic suspension height adjustment systems and the like. Currently, these systems operate as independent features or functions without realizing the synergistic benefits, the system simplification, and cost saving opportunities from an integrated systems approach. It would therefore be desirable to share the sensor units as much as possible and share the sensing algorithms and the computed variables so that cost savings and better system level performance may be achieved.

Due to the complexity of the vehicle control systems, it is sometimes not enough for the OEMs to work only on integrating control functions developed exclusively by auto suppliers. Therefore the aforementioned control function integration is never a simple job, especially when such function integration involves the control function, logic and software developed from both OEMs and auto suppliers. Many times, the control function partition between the OEMs and the auto suppliers are crossed in order for the OEMs to achieve specific vehicle performance requirements deemed important by the OEMs. For instance, the OEMs sometimes develop their own control functions, which may be in subsystem level. Such functions are either the enhancement over the existing control functions or new functions. For example, the RSC control function (including both the algorithms and the production code running in a production ECU environment) were developed by Ford Engineers in-house, and the brake system supplier is responsible for embedding Ford's software into its own brake ECU and interacting with other brake control functions developed by the brake supplier. That is, physically, the new functions developed by the OEMs reside in one of the supplier's ECUs. In this case, the auto supplier has the responsibility to integrate, into its own ECUs, the OEMs' software and its own software while the OEMs take the full responsibility for the overall vehicle system level function integration.

The OEMs could also develop a new subsystem level control function like RSC, which resides in its own system level ECU. In this case, the auto suppliers need to provide certain interfaces such that OEMs' ECU could access to each individual subsystem ECU.

Hence it is also desirable to define the function so as to guarantee that the aforementioned OEM development can be feasibly implemented using the current vehicle control system structure.

SUMMARY

In one aspect of this invention, an integrated vehicle control system includes an integrated sensing system, various actuators driven by various ECUs and various function-driven control algorithms residing in various ECUs but interacting with each other in an integration sense to achieve a refined or new vehicle system level control performance. The integrated sensing system is driven by the measurements from all the equipped sensors such as the environment sensors, the crash sensors, the occupant sensors, the actuator specific sensors, and the motion sensors. The function-driven control algorithms, although residing in different ECUs, could be coordinated through various ECU integrations.

In a further aspect of this invention, the motion sensor group includes a CMS (centralized motion sensor) cluster and various DS (decentralized sensor) units. The CMS cluster in this invention could have various configurations. The types of sensor elements used in the CMS cluster may be all or some of the following six types: a roll rate type of sensor element, a pitch rate type of sensor element, a yaw rate type of sensor element, a longitudinal acceleration type of sensor element, a lateral acceleration type of sensor element and a vertical acceleration type of sensor element. The number of the same type of sensors contained in the CMS cluster could be one or more than one. The angular types of sensors might have dual or multiple resolutions.

In one aspect of the invention, a CMS cluster is used in combination with the other decentralized sensor units to determine the dynamics states of a moving vehicle.

In a further aspect of the invention, the sensing algorithms using the measurements from the CMS cluster together with the decentralized sensor units includes sensor signal compensation, sensor plausibility check, vehicle attitude determination, abnormal state determination, directional velocity determination, vehicle parameter determination, force and loading determination, road profile determination, driver intension determination, and the like.

In another further aspect of this invention, a system level ECU called IVDC (integrated vehicle dynamic control) is used to integrate, monitor and supervise all the different control functions delivered from various ECUs.

In another further aspect of this invention, some of the subsystem ECUs are used to host the OEM's control algorithms. In such a case, the subsystem ECU is divided into the supplier's partition and the OEM's partition. Both the supplier and the OEM need to define the interfaces between the two partitions and the suppliers are responsible for integrating and arbitrating the final control commands sending to specific actuators.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 13 is a logic flow diagram of a method for controlling a vehicle dynamic system in accordance with a first embodiment of the present invention.

FIG. 14 is a logic flow diagram of a method for controlling a vehicle dynamic system in accordance with a second embodiment of the present invention.

FIG. 15 is a logic flow diagram of a method for controlling a vehicle dynamic system in accordance with a third embodiment of the present invention.

FIG. 16 is a logic flow diagram of a method for determining a lateral reference velocity.

FIG. 17 is a logic flow diagram for determining global roll and pitch attitudes.

DESCRIPTION OF THE PREFERRED EMBODIMENT

Figure 1:
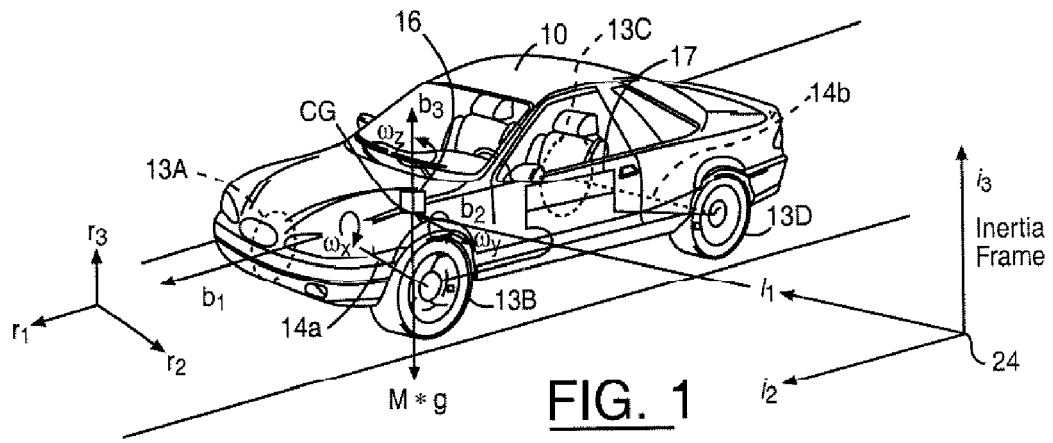
FIG. 1 is a diagrammatic view of a vehicle with variable vectors and coordinate frames according to the present invention.

In the following figures the same reference numerals will be used to identify the same components.

The present invention is preferably used in conjunction with vehicle dynamics control systems, which include but are not limited to various control systems such as a yaw stability control system, a roll stability control system, an anti-lock brake system, a traction control system, a hill hold control system, a hill descent/ascent control system, a suspension control system, a steering control system, a drive train control system, an integrated vehicle control system for achieving a balanced vehicle ride and handling performance, the fuel economy, the active and passive safety and the other vehicle level performances. The system is also described with respect to certain centralized motion sensor cluster configurations which include multiple motion sensor elements packed within a centralized compact unit, various decentralized sensor units and the sensing algorithms which utilize simultaneously all the available sensor measurements in an integration sense. Such a sensing function is called an Integrated Sensing System in the following description.

Referring to FIG. 1, an automotive vehicle 10 with an integrated vehicle control system of the present invention is illustrated with the various forces and moments thereon. Vehicle 10 has front right (FR) and front left (FL) wheel/tires 13A and 13B and rear right (RR) wheel/tires 13C and rear left (RL) wheel/tires 13D, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned before, the integrated vehicle control system may also be used with other dynamics control systems including active brake control systems, active/semi-active suspension systems, active/semi-active anti-roll bar, active differential system, active front steering system, active rear steering system, powertrain control system or may be used with safety systems such as crash mitigation systems, airbags, side curtains, pretensioners or other safety devices deployed or activated upon detecting the predetermined dynamic conditions of the vehicle.

A sensor system 16 is coupled to the integrated vehicle control system 17. Now referring to FIG. 2, the sensor system 16 may comprise an occupant sensor (OS) group 16a, an environment sensor (ES) group 16b, a crash sensor (CS) group 16c, an actuator-specific sensor (AS) group 16d, and a motion sensor (MS) group 16e. The sensor system 16 is shown adjacent to a vehicle dynamics box 9, which represents the physical movement of the vehicle. In other words, the sensors sense the movement of the vehicle and the interactions among different subsystems. The vehicle dynamics box 9 are affected by the activation of actuators 12.

The integrated vehicle control unit 17 includes an IVC (integrated vehicle control) ECU 18a, a RCM (restraint control module) ECU 19a, a suspension control ECU 19b, a 4×4 control module ECU 19c, a PCM (powertrain control module) ECU 19d, a steering control ECU 19e, and a brake control module ECU 20. The integrated vehicle control system 17 is coupled to and interacts with vehicle CAN network 5, dedicated (or private) CAN network 6 specified for individual applications and a integrated actuator group 12.

The integrated actuator group 12 contains a passive safety module 12a, a controlled suspension module 12b, a drivetrain module 12c, a engine system 12d, a steering system 12e and a brake system 12f.

Figure 2:
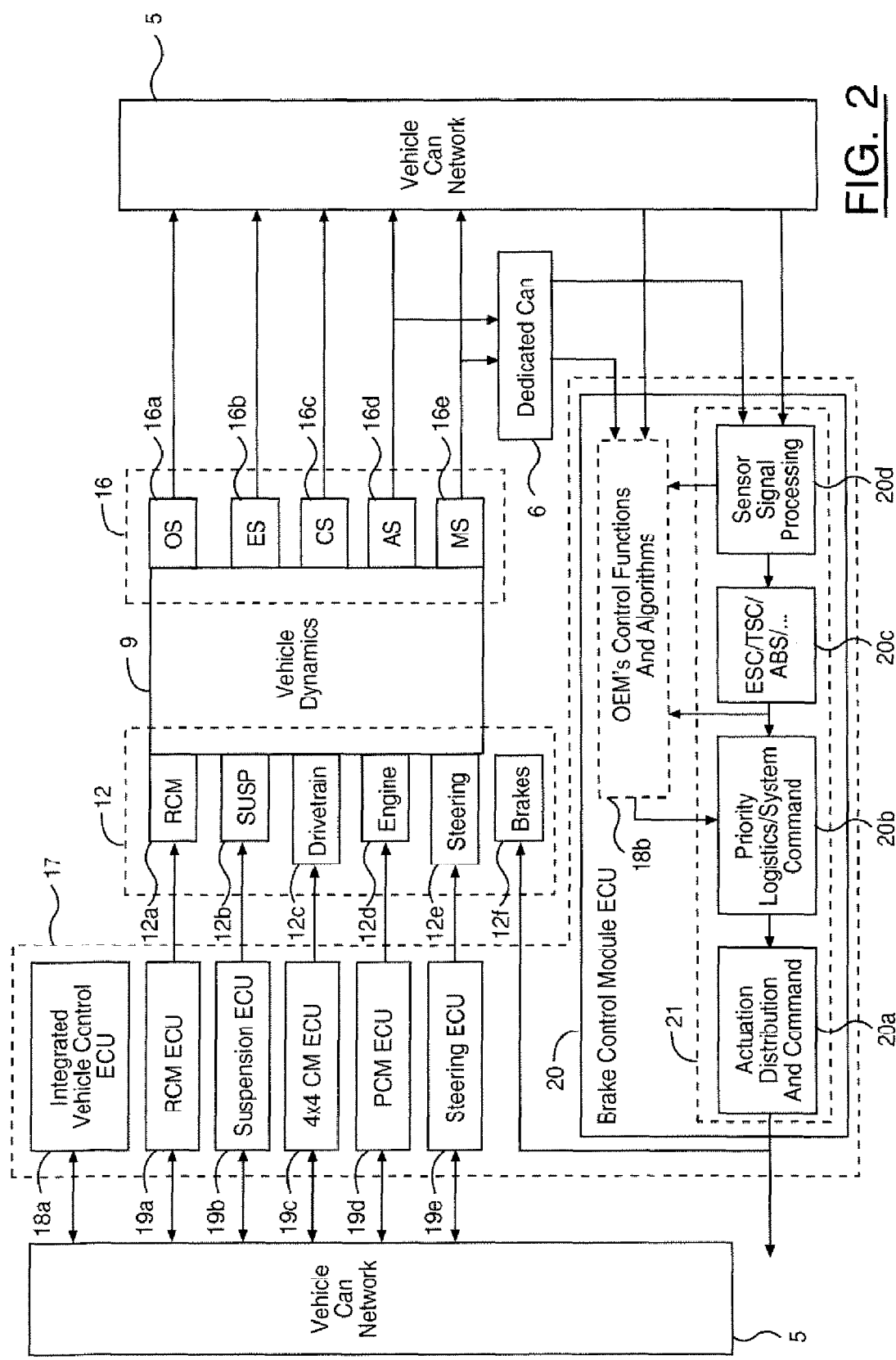
FIG. 2 is a block diagram of a stability system according to the present invention.

A vehicle system level supervision logic developed by the OEMs may be embedded in a integrated vehicle control ECU 18a and may also be embedded in an ECU from a supplier system. The individual control functions developed by the OEMs could also be embedded in the system level ECU such as 18a owned by the OEMs, or embedded in a supplier's ECU. FIG. 2 shows an OEM's function development 18b embedded in the brake control module 20. Such OEM developed functions interact with a brake supplier's function partition 21, which includes a sensor signal processing unit 20d, function unit 20c (including brake control functions such as ESC including ABS, RSC, TCS, etc.), priority logic and system level commanding unit 20b and an actuation distribution and commanding unit 20a.

Figure 3A:
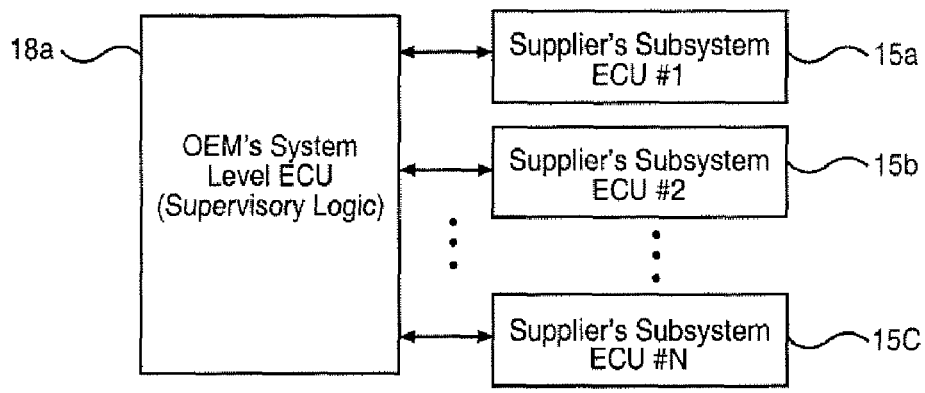
FIGS. 3A-3C are the block diagrammatic embodiments of an ECU interfacing with a supplier-based system.
Figure 3B:
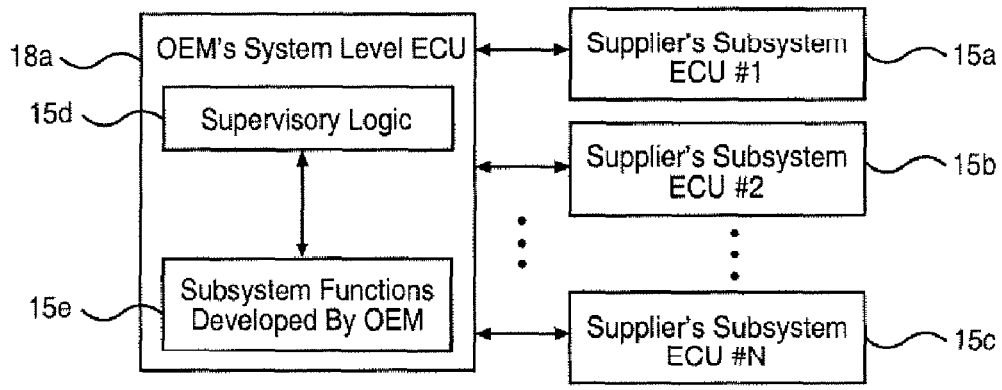

Notice that the physical location of unit 18a and 18b in the integrated vehicle control system only provides one possible function integration arrangement of an OEM function development. This can be seen in FIGS. 3A-3C, where three configurations are included. In FIG. 3A, the OEM's development is limited at the vehicle system level, i.e., only the supervisory and monitoring logic are conducted in the system level IVC ECU 18a. The supplier's ECUs are set forth as 15a, b, and c. In FIG. 3B, the OEM involves both the development of new functions such as RSC developed by Ford and a supervisory/monitoring logic 15d for all the functions associated with each individual ECU from the suppliers including subsystem functions 15e. Such functions are embedded in the system level ECU 18a and the specific actuators can be driven by the OEM's function through the supplier's ECU.

Figure 3C:
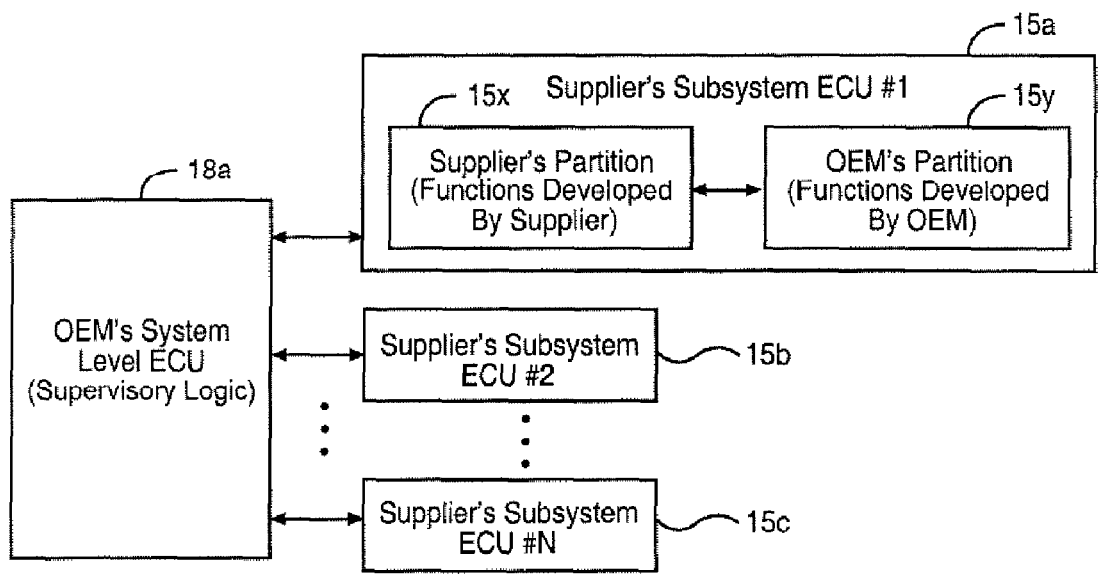

FIG. 3C shows a case where the OEM's new development is embedded in one of the suppliers ECUs and the OEM integrates the function developed by the involved ECUs. Thus, the blocks 15x and 15y represent the supplier's partitions and OEM partitions, respectively.

Figure 4:
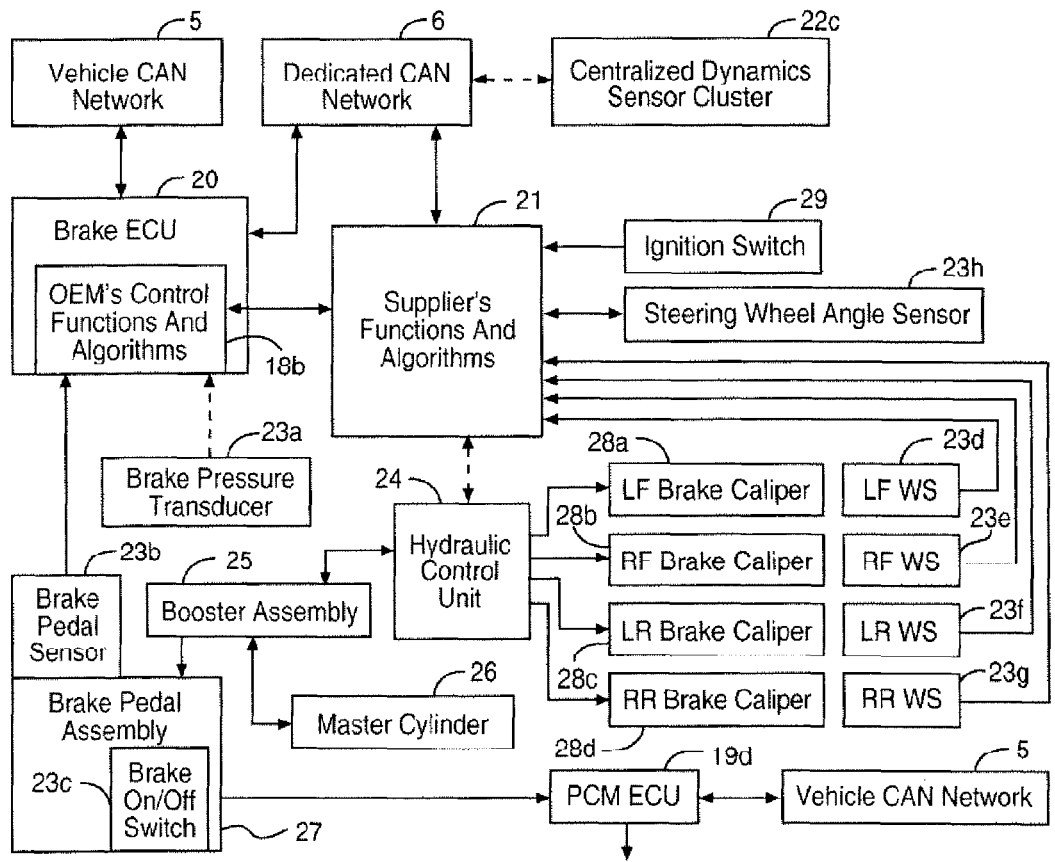
FIG. 4 is a block diagram of a vehicle system according to the present invention.

Referring now to FIG. 4, a further detailed interaction between the brake ECU 20, sensors and the actuators are illustrated using an integrated brake control system specified to the current invention is shown.

The brake ECU 20 contains the OEM's function 18b and the supplier's function 21. The brake ECU 20 receives measurements from the CMS cluster through a private control area network (CAN) 6, from the decentralized sensor units such as a brake pressure transducer 23a, a brake pedal sensor 23c, a wheel speed sensors 23d, 23e, 23f and 23g, a steering wheel sensor 23h and ignition switch 29. The ECU 20 is powered by a vehicle electrical distribution system. Brake control module ECU 20 also receives the other signals such as the throttle information through the vehicle CAN network 5. The outputs of ECU 20 drive a hydraulic control unit 24, which is mechanically connected to a booster assembly 25. The booster assembly 25 is also mechanically connected to a master cylinder/reservoir 26 and a brake pedal assembly 27. The hydraulic control unit 24 also sends brake fluid to each of four brake calipers 28a, 28b, 28c and 28d. Notice that 23a, 23b, 23c, 23d, 23e, 23f, and 23g consists of a subset of the decentralized sensor group; and the actuators 24, 25, 26, 28a, 28b, 28c and 28d compromise a subset of the integrated actuation system. This integrated brake control system is of the type of configuration of FIG. 3C.

Figure 5:
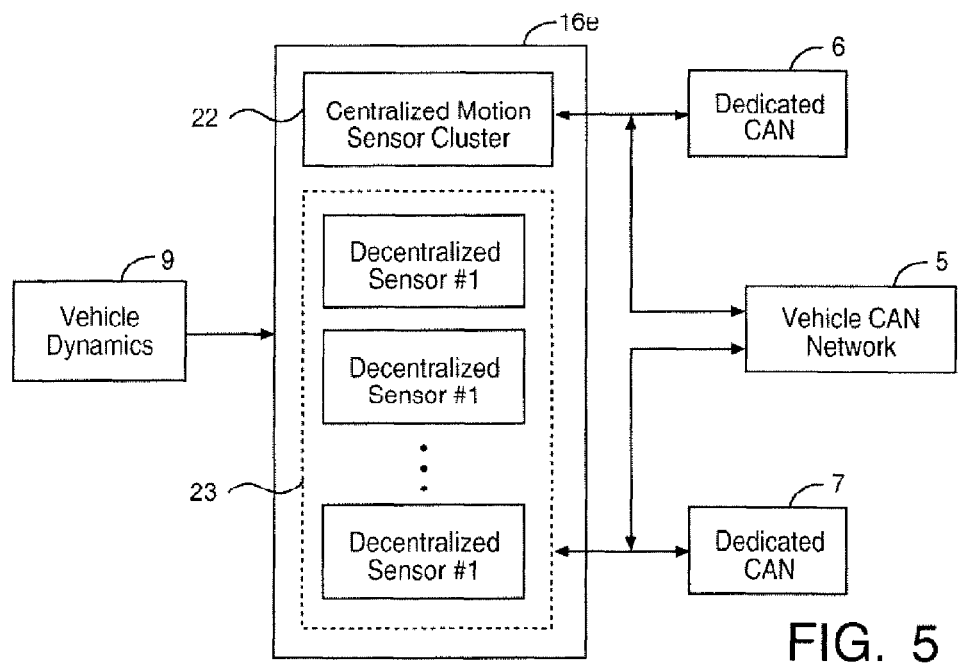
FIG. 5 is a block diagram of a sensor cluster according to the present invention.

Referring now to FIG. 5, the motion sensor group 16e in FIG. 2 may be further partitioned based on whether the multiple inertial sensors are packaged at a single location as shown and how the decentralized sensors are arranged in the vehicle. All the sensors, which are packaged in a centralized place in the vehicle body, are denoted as unit 22 which is also called the CMS cluster. All the sensors which are located in various places on the vehicle body consist of a decentralized sensor group 23.

Figure 6:
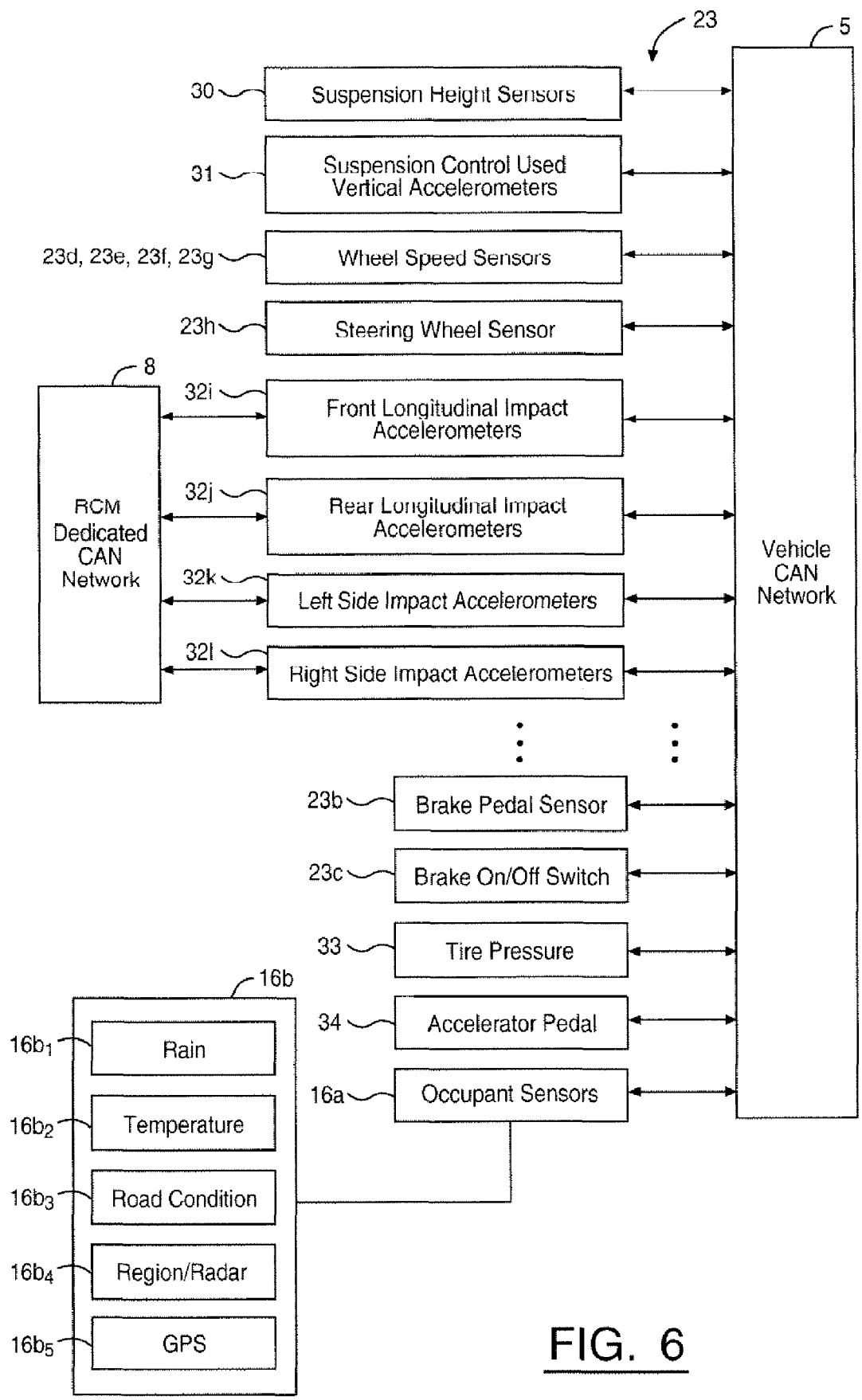
FIG. 6 is a block diagram of a sensor system according to the present invention.

Referring now to FIG. 6, a further detailed decentralized sensor group 23 is shown, which includes a suspension height sensor set 30 that may include four individual sensors located on the four corners of the vehicle; a vertical acceleration sensor set 31 used by the suspension control; the wheel speed sensors 23d, 23e, 23f and 23g which are mounted at each wheel and generate signals corresponding to the rotational speed of each wheel; a steering wheel angle sensor 23h; a front longitudinal impact acceleration sensor set 32i which may include a single or multiple longitudinal accelerometers located on the front bumper; a rear longitudinal impact acceleration sensor set 32j which may include a single or multiple longitudinal accelerometers located on the rear bumper; a left side impact lateral acceleration sensor set 32k which may include two lateral acceleration sensors located on the front left door and the left C-pillar; a right side impact acceleration sensor set 32l which may contain two lateral accelerometers located on the front right door and the right C pillar. All the impact sensors are connected to a private CAN network 8, which is dedicated to the restraint control module (RCM). The restraint control may include reversible and irreversible safety devices. Reversible devices may include seat belt pretensioner, seat, window, sunroof, and door controls; and the other decentralized sensors include but are not limited to the brake pedal sensor 23b, a brake on/off switch 23c, tire pressure sensors 33, an acceleration pedal sensor 34, and occupant sensors 16a.

Referring now to FIG. 7A-F, in CMS cluster 50, multiple inertial sensor elements are mounted orthogonally with each other on a printed circuit board (PCB) together with a microcontroller/microprocessor 43, EEPROM 41, voltage regulator 39, watchdog 40, a clock 48, and ASICs 49. The PCB is fixed in a sensor cluster housing 50 and sealed by a protective cover. The internal data (including measured inertial signals, control loop parameters, temperature signals) transfers between the different sensor elements and the microcontroller and are done by a synchronous bi-directional serial data link with certain baud rate. The internal data is then checked by the microcontroller and transformed in a CAN-matrix and transmitted via CAN to the requested ECU. The interfaces between the sensor cluster and the external CAN may include four pins, where two of them are used for power supply, and the other two for transferring data via CAN.

In operation, the CMS cluster is preferably mounted directly on the center of gravity of the vehicle body. Ideally, the CMS cluster measures the vehicle body's motion variables along the vehicle's body-fixed frames which are along the directions x, y and z shown in FIG. 1. As those skilled in the art will recognize, the frame from $b_1$, $b_2$ and $b_3$ is called a body frame, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. Notice that the outputs of the CMS cluster are measurements along the sensor cluster's three orthogonal axes, $s_1$, $s_2$ and $s_3$ (not shown), which indicate the longitudinal, lateral, and vertical directions of the sensor cluster. The vehicle body's longitudinal, lateral and vertical directions are defined through axes $b_1$, $b_2$ and $b_3$. In order to use the sensor cluster to measure the vehicle body motions along the three body fixed axes $b_1$, $b_2$ and $b_3$, the CMS cluster may be mounted such that the axes $s_1$, $s_2$ and $s_3$ are exactly along the directions of $b_1$, $b_2$ and $b_3$ (shown in FIG. 1). Due to sensor mounting error, there may be a misalignment between the sensor cluster axes and the vehicle body fixed axes. However, such sensor misalignment can be detected (see U.S. Pat. No. 6,782,315 issued Aug. 24, 2004, which is incorporated by reference herein) and the sensor signals can be compensated to characterize the vehicle body variables along the vehicle body fixed axes. For this reason, in the following discussion the sensor outputs are assumed to be the same as the variables defined along the vehicle body axes. That is, as is best shown in FIG. 1, the longitudinal accelerometer has the sensing direction along $b_1$ axis, the lateral accelerometer has the sensing direction along $b_2$ axis, the vertical accelerometer has the sensing direction along $b_3$ axis, the roll rate sensor has the sensing direction along $b_1$ axis, the pitch rate sensor has the sensing direction along $b_2$ axis, the yaw rate sensor has the sensing direction along $b_3$ axis. Also notice that the CMS cluster can be mounted on any location within the vehicle body, however it can also be numerically translated to any specific location of interest, such as the center of gravity of the vehicle body.

There are many types of arrangements and contents of the inertial elements inside the CMS cluster 50. Although the present invention covers the six configurations illustrated below in FIGS. 7A, 7B, 7C, 7D, 7E, and 7F, other combinations of inertial sensor elements can be similarly constructed.

Figure 7A:
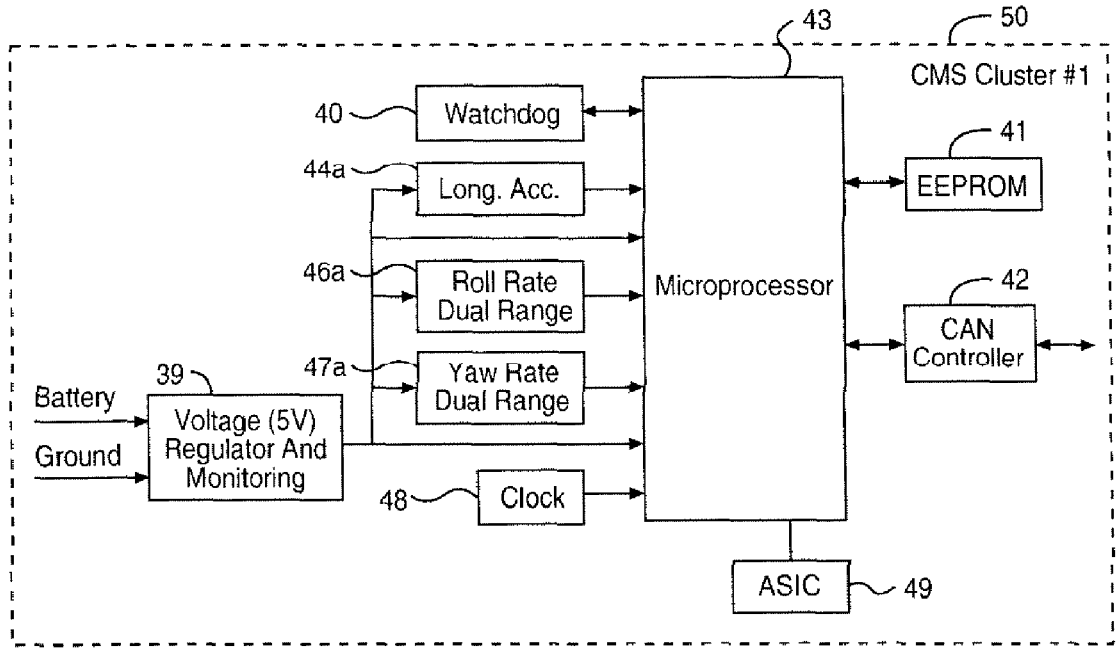
FIGS. 7A-7F are block diagrams of various embodiments of a CMS sensor cluster.

Referring specifically to FIG. 7A, CMS cluster #1 includes a voltage regulator and monitor 39, a watchdog 40, an EEPROM 41, a CAN controller 42, a microprocessor 43, a longitudinal accelerometer 44a whose output is denoted as $a_x$, a lateral accelerometer 45a whose output is denoted as $a_y$, a roll rate sensor element 46a which has dual or multiple resolution in order to achieve multiple operation range and whose output is denoted as $\omega_x$, a yaw rate sensor element 47a which has dual or multiple resolution whose output is denoted as $\omega_z$. Notice that this sensor cluster is the same as the one used in the Ford RSC system. Only one difference is that both the roll and yaw rate sensors need to have a dual or multiple resolution, which can be achieved through minimum addition of hardware but proper algorithms embedded in the microprocessor 43. For example, if the angular rate measurements are below certain threshold, a high resolution is used and if the angular rate measurements are above the same threshold a low resolution is used. In this way large roll and yaw rate cases may be monitored by the current sensor cluster. This dual or multiple resolution may be important when the current sensor cluster is used for multiple purposes such as for applications with both the RSC control (with medium range of roll rate) and the rollover curtain deployment (with high range of roll rate).

Figure 7B:
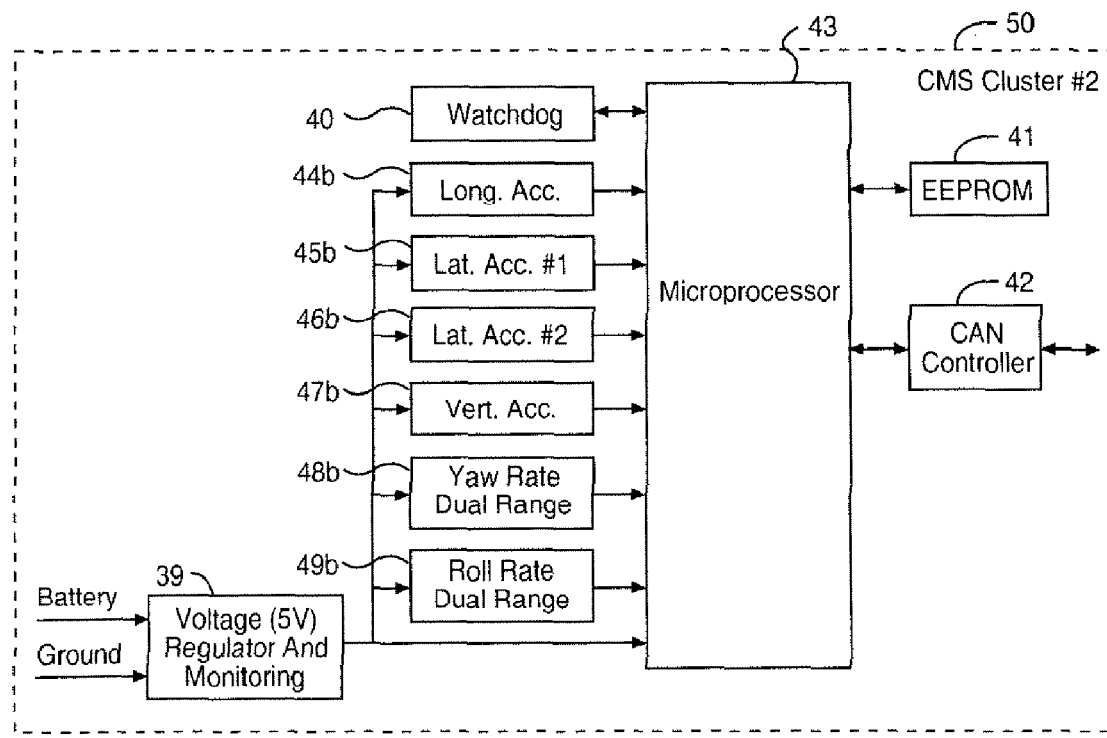

Referring to FIG. 7B, another embodiment, the CMS cluster #2, includes a voltage regulator and monitor 39, a watchdog 40, an EEPROM 41, a CAN controller 42, a microprocessor 43, a longitudinal accelerometer 44b whose output is denoted as $a_x$, a low-g lateral accelerometer 45b whose output is denoted as $a_{y1}$, a high-g lateral accelerometer 46b whose output is denoted as $a_{y2}$, a vertical accelerometer 47b whose output is denoted as $a_z$, a dual or multiple resolution yaw rate sensor element 48b and whose output is denoted as $\omega_z$, and a dual or multiple resolution roll rate sensor element 49b and whose output is denoted as $\omega_x$. The sensor cluster may be used for measuring and monitoring vehicle motions for RSC control, side impact detection and rollover curtain deployment. In this embodiment, only one side impact accelerometer is integrated into this sensor cluster. There are other impact sensor units which are required to be mounted on special decentralized locations and which cannot be integrated into such a CMS cluster.

Figure 7C:
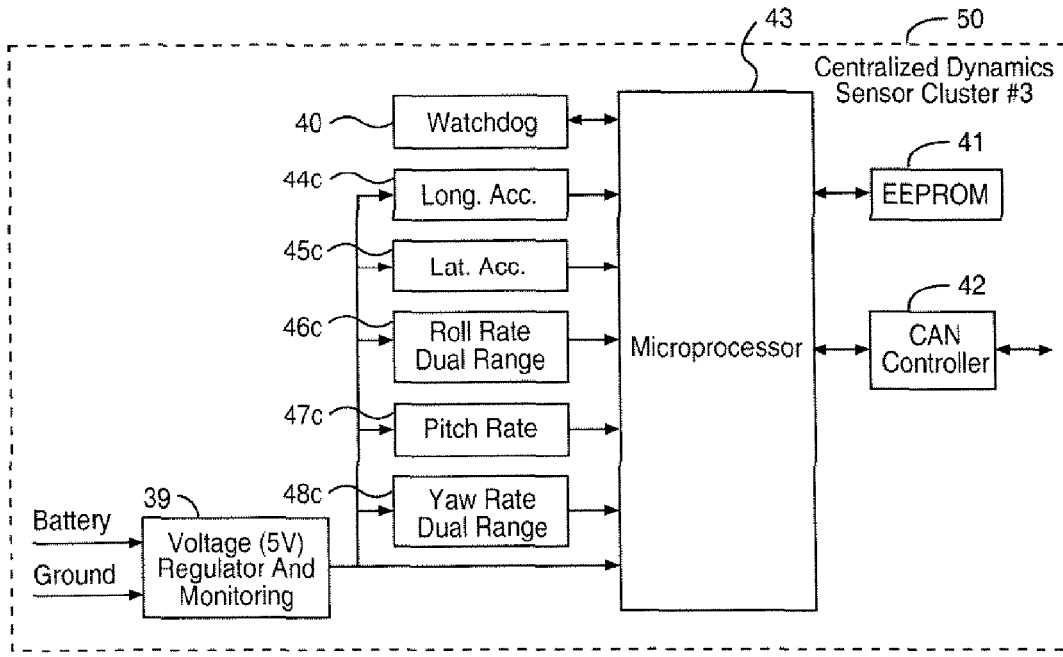

Referring to FIG. 7C, another embodiment, the CMS cluster #3, includes a voltage regulator and monitor 39, a watchdog 40, an EEPROM 41, a CAN controller 42, a microprocessor 43, a longitudinal accelerometer 44c whose output is denoted as $a_x$, a lateral accelerometer 45c whose output is denoted as $a_y$, a dual or multiple resolution roll rate sensor element 46c whose output is denoted as $\omega_x$, a pitch rate sensor element 47c whose output is denoted as $\omega_y$, and a dual or multiple resolution yaw rate sensor element 48c whose output is denoted as $\omega_y$.

Figure 7D:
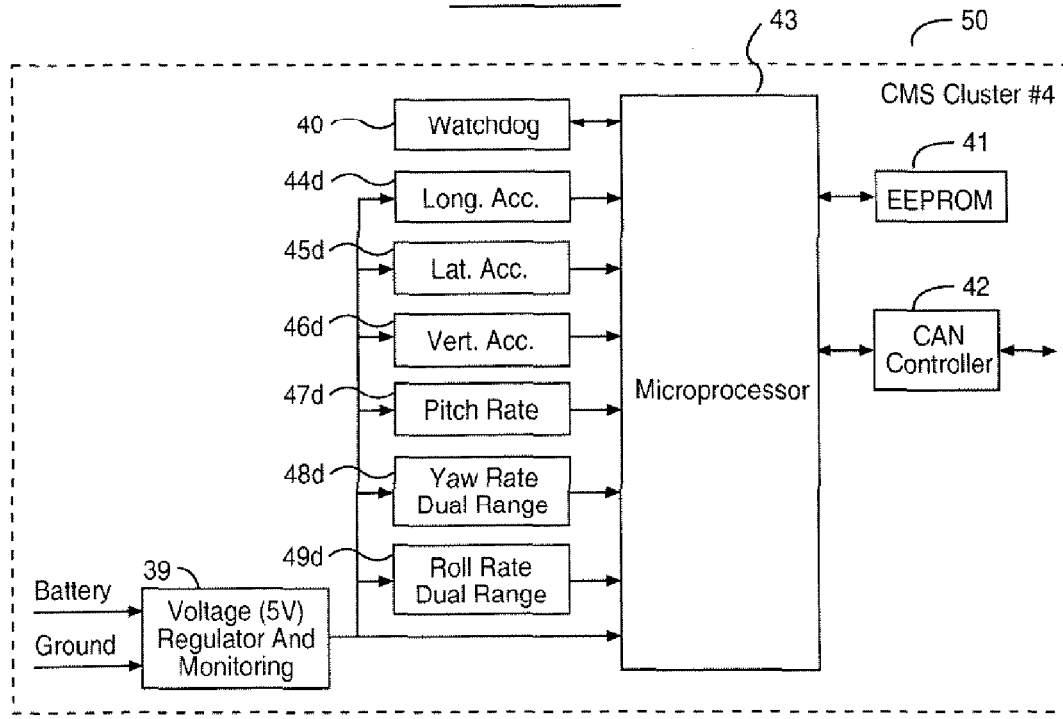

Referring to FIG. 7D, another embodiment, the CMS cluster #4, includes a voltage regulator and monitor 39, a watchdog 40, an EEPROM 41, a CAN controller 42, a microprocessor 43, a longitudinal accelerometer 44d whose output is denoted as $a_x$, a lateral accelerometer 45d whose output is denoted as $a_y$, a vertical accelerometer 46d whose output is denoted as $a_z$, a pitch rate sensor element 47d whose output is denoted as $\omega_y$, a dual or multiple resolution roll rate sensor element 48d whose output is denoted as $\omega_x$, and a dual or multiple resolution yaw rate sensor element 49d whose output is denoted as $\omega_z$. Notice that this sensor cluster is the same as the so-called IMU (inertial measurement unit), which is widely used in the aerospace industry, except for the dual or multiple resolution requirement for the roll and yaw angular rates.

Figure 7E:
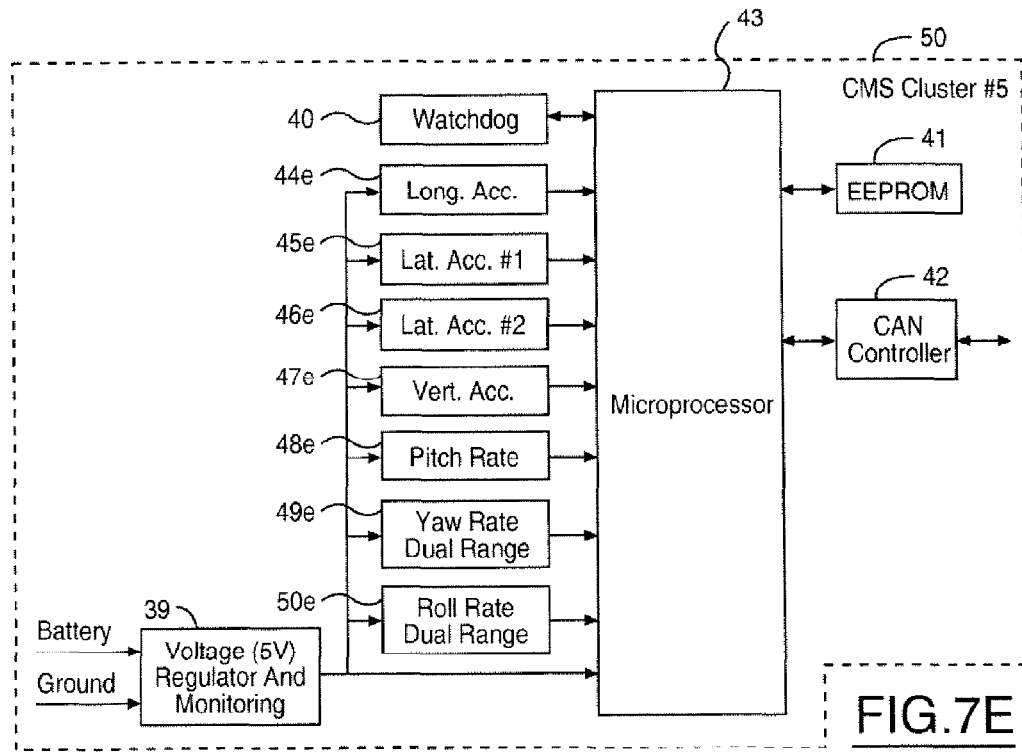

Referring to FIG. 7E, another embodiment, the CMS cluster #5, includes a voltage regulator and monitor 39, a watchdog 40, an EEPROM 41, a CAN controller 42, a microprocessor 43, a longitudinal accelerometer 44e whose output is denoted as $a_x$, a low-g lateral accelerometer 45e whose output is denoted as $a_{y1}$, a high-g lateral accelerometer 46e whose output is denoted as $a_{y2}$, a vertical acceleration 47e whose output is denoted as $a_z$, a pitch rate sensor element 48e whose output is denoted as $\omega_y$, a dual or multiple resolution yaw rate sensor element 49e whose output is denoted as $\omega_z$, and dual or multiple resolution roll rate sensor element 50e whose output is denoted as $\omega_x$. This sensor cluster may be used for vehicle dynamics controls, side impact determination, airbag, and rollover curtain deployment.

Figure 7F:
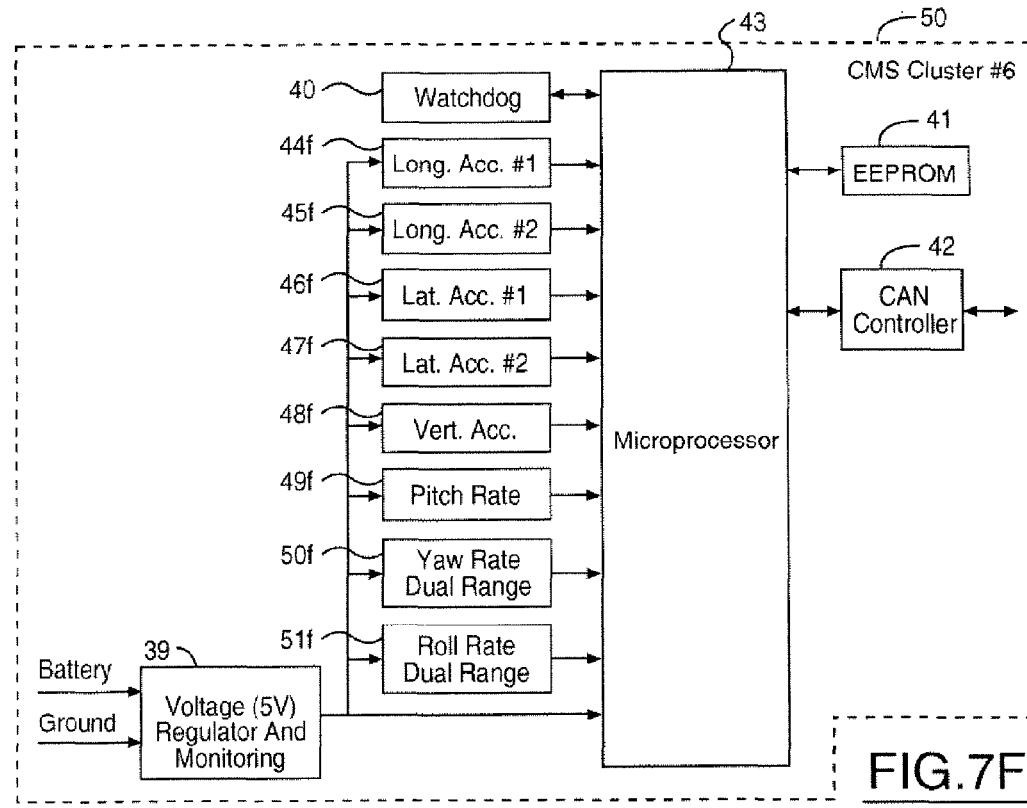

Referring to FIG. 7F, in another embodiment, the CMS cluster #6, includes a voltage regulator and monitor 39, a watchdog 40, an EEPROM 41, a CAN controller 42, a microprocessor 43, a low-g longitudinal accelerometer 44f whose output is denoted as $a_{x1}$, a high-g longitudinal accelerometer 45f whose output is denoted as $a_{x2}$, a low-g lateral accelerometer 46f whose output is denoted as $a_{y1}$, a high-g lateral accelerometer 47f whose output is denoted as $a_{y2}$, a vertical acceleration 48f whose output is denoted as $a_z$, a pitch rate sensor element 49f whose output is denoted as $\omega_z$, a dual or multiple resolution pitch rate sensor element 50f whose output is denoted as $\omega_y$, and a dual or multiple resolution roll rate sensor element 51f whose output is denoted as $\omega_x$. Notice that this sensor cluster may be used for various vehicle dynamics controls, side impact determination, front and rear impact/crash determination, driver and passenger airbag deployments, and rollover curtain deployment.

Together with the sensor signals in the decentralized sensor units, any of the aforementioned CMS cluster embodiments may be used to characterize the vehicle body motion variables. The vehicle longitudinal velocity is denoted as $v_x$, the vehicle body roll attitude with respect to the sea level as $\theta_x$, the vehicle body pitch attitude with respect to the sea level as $\theta_y$, the vehicle body lateral velocity at the sensor location but measured along the vehicle body fixed lateral axis as $v_y$.

Figure 8:
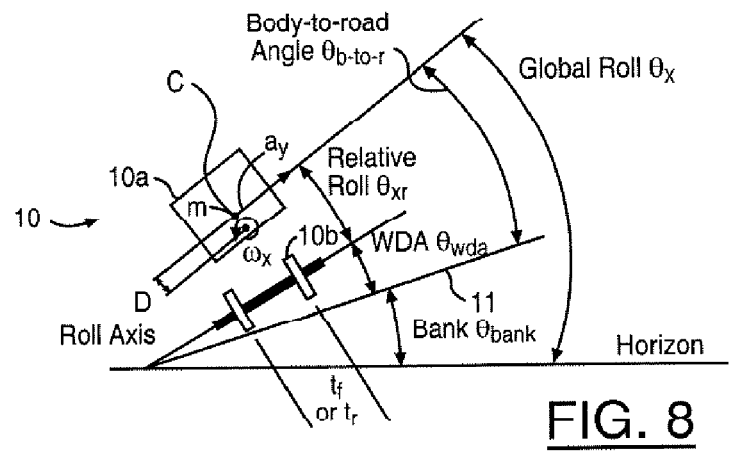
FIG. 8 is a front view of an automotive vehicle illustrating various angles according to the present invention.

Referring now to FIG. 8, the relationship of the various angles of the vehicle 10 relative to the road surface 11 is illustrated. In FIG. 8, a reference road bank angle $\theta_{bank}$ is shown relative to the vehicle 10 on a road surface. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the aforementioned relative roll angle from the calculated global roll angle. If all things were slowly changing without drift, errors or the like, the linear bank angle and reference road bank angle terms would be equivalent.

During an event causing the vehicle to roll, the vehicle body is subject to a roll moment due to the coupling of the lateral tire force and the lateral acceleration applied to the center of gravity of vehicle body. This roll moment causes suspension height variation, which in turn results in a vehicle relative roll angle (also called chassis roll angle or suspension roll angle). The relative roll angle is an important variable that is used as an input to the RSC activation criteria and to construct the feedback brake pressure command for RSC function, since it captures the relative roll between the vehicle body and the axle. The sum of such a chassis roll angle and the roll angle between wheel axle and the road surface (called wheel departure angle) provides the roll angle between the vehicle body and the average road surface, which is one of the important variables feeding back to the roll stability control module.

Figure 9:
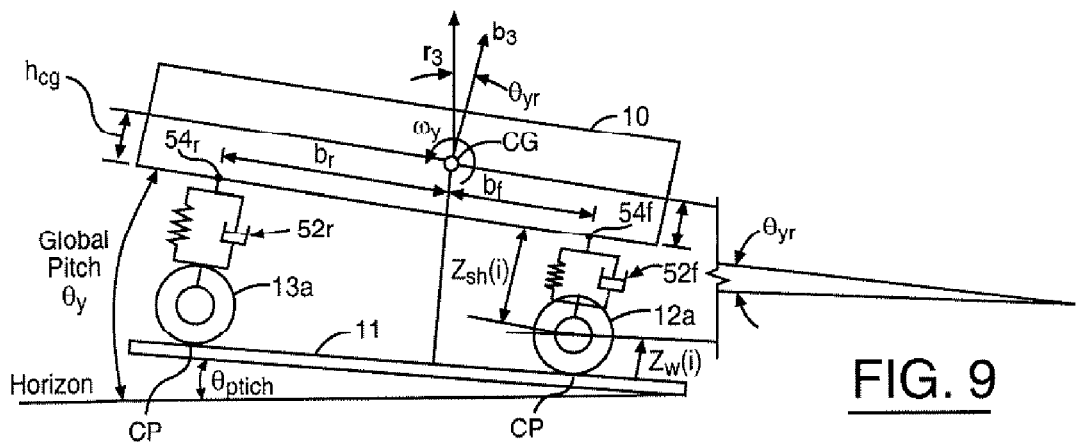
FIG. 9 is a side view of an automotive vehicle illustrating various variables thereon.

Referring now to FIG. 9, an automotive vehicle 10 is illustrated with various parameters illustrated thereon. The side view of automotive vehicle 10 is illustrated. A front suspension 52f and a rear suspension 52r are illustrated. The suspensions are coupled to the body at a respective suspension point 54f, 54r. The distance from the suspension point 54f to the center of the wheel is labeled $z_{sh}$. The distance from the center of gravity CG to the front suspension is labeled as $b_f$. The distance from the CG to the rear suspension point 54r is labeled as $b_r$. The vertical distance between the center of gravity and the suspension point is labeled as $h_{cg}$. A portion of the body axis $b_3$ and the road axis $r_3$ are illustrated. The angle therebetween is the relative pitch angle $\theta_{yr}$. The rolling radius of the tire is labeled as $z_w$.

Figure 10:
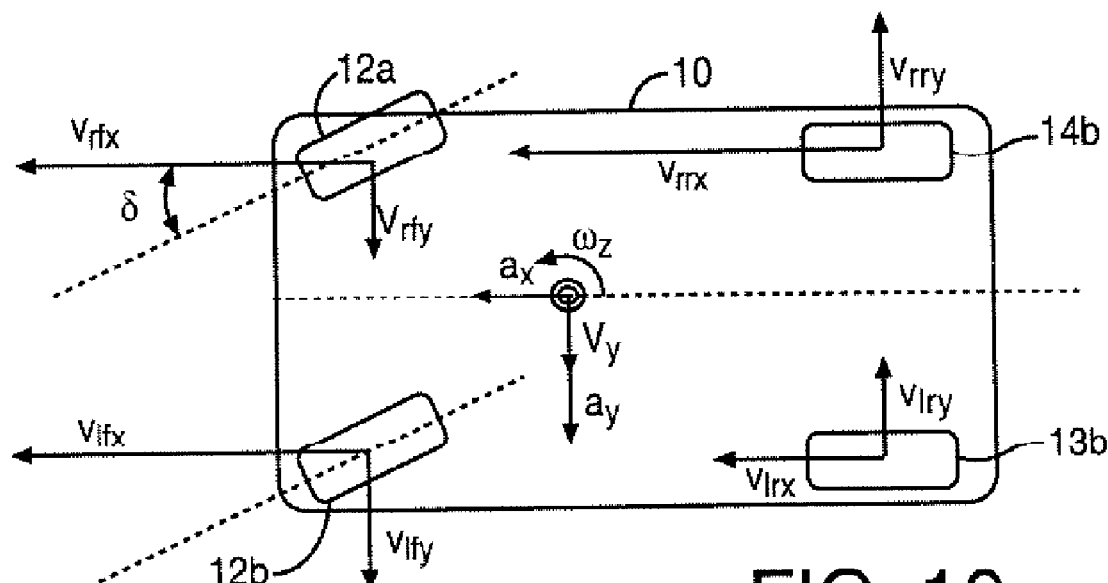
FIG. 10 is a top view of a motor vehicle illustrating various operating parameters of a vehicle experiencing a turning maneuver on a road surface.

Referring now to FIG. 10, a top view of vehicle 10 is illustrated. The lateral and longitudinal velocities of the center of gravity are $v_x$ and $v_y$, a yaw angular rate is $\omega_z$, a front wheel steering angle is $\delta$, lateral acceleration is represented by $a_y$, and longitudinal acceleration is represented by $a_x$.

By using signals from the CMS cluster #1 and neglecting the vertical motion of the vehicle, the following relationships in digital environment are set forth:

$$a_x = dv_x - \omega_z v_y - g\sin(\theta_y)$$

$$a_y = dv_y + \omega_z v_x + g\sin(\theta_x)\cos(\theta_y)$$

$$d\theta_{xl} = \omega_{xl} + [\omega_y \sin(\theta_x) + \omega_z \cos(\theta_x)]\tan(\theta_y)$$

if in low resolution $$d\theta_{xh} = \omega_{xh} + [\omega_y \sin(\theta_x) + \omega_z \cos(\theta_x)]\tan(\theta_y) \quad (1)$$

if in high resolution
where $dv_x$ and $dv_y$ are the time derivatives of $v_x$ and $v_y$. $d\theta_{xl}$ and $d\theta_{xh}$ are the time derivatives of the low resolution roll angle $\theta_{xl}$ and the high resolution roll angle $\theta_{xh}$. Notice that, the yaw rate $\omega_z$ may be the low resolution yaw rate $\omega_{zl}$ or the high resolution yaw rate $\omega_{zh}$, but there is no need to differentiate them in (1). Theoretically, through the above set of relationships, the vehicle motion states may not be uniquely determined due to the lack of information in pitch angle. Practically, using dynamics condition screening and the other decentralized sensor units, the pitch angle may be either neglected or be conditionally determined or approximated. Along this line of thinking, the RSC roll sensing has been conducted as in a series of patent and patent applications (see for example, U.S. Pat. No. 6,556,908, U.S. Pat. No. 6,631,317, U.S. Pat. No. 6,671,595, U.S. Pat. No. 6,718,248, U.S. Pat. No. 6,715,240, U.S. Pat. No. 6,915,193, the disclosures of which are incorporated by reference herein). The accuracy of the roll angle may be different for different roll rate ranges. For example, for roll rate with magnitudes below 94 deg/sec, the roll angle has high resolution denoted as $\theta_{xh}$. For roll rate magnitude beyond 94 deg/sec, a low resolution roll angle is computed which is denoted as $\theta_{xl}$.

By using signals from the CMS cluster #2, the following relationships are set forth:

$$a_x = dv_x + \omega_y v_z - \omega_z v_y - g\sin(\theta_y)$$

$$a_{y1} = dv_y + \omega_z v_x - \omega_x v_z + g\sin(\theta_x)\cos(\theta_y)$$

$$a_{y2} = dv_y + \omega_z v_x - \omega_x v_z + g\sin(\theta_x)\cos(\theta_y)$$

$$a_z = dv_z + \omega_x v_y - \omega_y v_x + g\cos(\theta_x)\cos(\theta_y)$$

$$d\theta_{xl} = \omega_{xl} + [\omega_y \sin(\theta_x) + \omega_z \cos(\theta_x)]\tan(\theta_y)$$

if in low resolution $$d\theta_{xh} = \omega_{xh} + [\omega_y \sin(\theta_x) + \omega_z \cos(\theta_x)]\tan(\theta_y) \quad (2)$$

if in high resolution where $v_z$ is the vertical velocity of the vehicle body along its vertical direction. $dv_z$ is the time derivative of $v_z$. $d\theta_{xl}$ and $d\theta_{xh}$ are the time derivatives of the low resolution roll angle $\theta_{xl}$ and the high resolution roll angle $\theta_{xh}$. The set of relationships in (2) is similar to the CMS cluster #1 case in which the vehicle states are theoretically unobservable due to lack of pitch information.

By using signals from the CMS cluster #3 and neglecting the vertical motion of the vehicle, the following relationships are set forth:

$$a_x = dv_x - \omega_z v_y - g\sin(\theta_y)$$

$$a_y = dv_y + \omega_z v_x + g\sin(\theta_x)\cos(\theta_y)$$

$$d\theta_{xl} = \omega_{xl} + [\omega_y \sin(\theta_x) + \omega_z \cos(\theta_x)]\tan(\theta_y)$$

if in low resolution $$d\theta_{xh} = \omega_{xh} + [\omega_y \sin(\theta_x) + \omega_z \cos(\theta_x)]\tan(\theta_y)$$

if in high resolution $$d\theta_y = \omega_y \cos(\theta_x) - \omega_z \sin(\theta_x) \quad (3)$$

where $d\theta_y$ is the time derivative of the pitch angle $\theta_y$. Through the set of relationships in (3), the vehicle motion variables $v_x$, $v_y$, $\theta_{xl}$, $\theta_{xh}$, $\theta_y$ may be determined.

By using signals from the CMS cluster #4 and neglecting the vertical motion of the vehicle, the following relationships are set forth:

$$a_x = dv_x - \omega_z v_y - g\sin(\theta_y)$$

$$a_y = dv_y + \omega_z v_x + g\sin(\theta_x)\cos(\theta_y)$$

$$a_z = dv_z + \omega_x v_y - \omega_y v_x + g\cos(\theta_x)\cos(\theta_y)$$

$$d\theta_{xl} = \omega_{xl} + [\omega_y \sin(\theta_x) + \omega_z \cos(\theta_x)]\tan(\theta_y)$$

if in low resolution $$d\theta_{xh} = \omega_{xh} + [\omega_y \sin(\theta_x) + \omega_z \cos(\theta_x)]\tan(\theta_y)$$

if in high resolution $$d\theta_y = \omega_y \cos(\theta_x) - \omega_z \sin(\theta_x) \quad (4)$$

where $dv_z$ is the time derivative of the vehicle's vertical velocity $v_z$. Through the set of relationships in (4), the vehicle motion variables $v_x$, $v_y$, $v_z$, $\theta_{xl}$, $\theta_{xh}$, $\theta_y$ may be determined. Notice that $v_z$ is a variable used in the suspension heave control while the rest of variables form one embodiment of a minimum set of core vehicle motion states for vehicle stability controls. The core set of states depends on various parameters such as the vehicle configuration, desired accuracy, known variables, and the like.

By using signals from the CMS cluster #5 and neglecting the vertical motion of the vehicle, the following relationships are set forth:

$$a_x = dv_x - \omega_z v_y - g\sin(\theta_y)$$

$$a_{y1} = dv_{ynsi} + \omega_z v_x + g\sin(\theta_x)\cos(\theta_y)$$

$$a_{y2} = dv_{ysi} + \omega_z v_x + g\sin(\theta_x)\cos(\theta_y)$$

$$d\theta_{xl} = \omega_{xl} + [\omega_y \sin(\theta_x) + \omega_z \cos(\theta_x)]\tan(\theta_y)$$

if in low resolution $$d\theta_{xh} = \omega_{xh} + [\omega_y \sin(\theta_x) + \omega_z \cos(\theta_x)]\tan(\theta_y)$$

if in high resolution $$d\theta_y = \omega_y \cos(\theta_x) - \omega_z \sin(\theta_x) \quad (5)$$

where $dv_{ynsi}$ is the time derivative of the lateral velocity $v_{ynsi}$ during non-side-impact event, and $dv_{ysi}$ is the time derivative of the lateral velocity $v_{ysi}$ during side impact.

By using signals from the CMS cluster #6 and neglecting the vertical motion of the vehicle, the following relationships are set forth:

$$a_{x1} = dv_x - \omega_z v_y - g\sin(\theta_y)$$

$$a_{x2} = dv_x - \omega_z v_y - g\sin(\theta_y)$$

$$a_{y1} = dv_y + \omega_z v_x + g\sin(\theta_x)\cos(\theta_y)$$

$$a_{y2} = dv_y + \omega_z v_x + g\sin(\theta_x)\cos(\theta_y)$$

$$d\theta_{xl} = \omega_{xl} + [\omega_y \sin(\theta_x) + \omega_z \cos(\theta_x)]\tan(\theta_y)$$

if in low resolution $$d\theta_{xh} = \omega_{xh} + [\omega_y \sin(\theta_x) + \omega_z \cos(\theta_x)]\tan(\theta_y)$$

if in high resolution $$d\theta_y = \omega_y \cos(\theta_x) - \omega_z \sin(\theta_x) \quad (6)$$

Notice that the dual or multiple resolution for the roll and yaw angular rate signals can be conducted through minimum addition of hardware and through algorithms embedded in the microprocessor within a CMS cluster.

Basic Relationships Among the Variables of Interest

The fundamental relationships among the vehicle state variables might be conditionally obtained through the relationships in Equations (1)-(6) may be calculated. Notice also that due to the sensor offset, temperature drift, nonlinearity in scaling factors, direct integrations of the differential Equations (1)-(6) is usually difficult for practical implementation.

If the CMS cluster #3, #4, #5, #6 are used, then the following variables may be computed which are solely based on the three angular rate sensors $$\theta_{xss1} = \sin^{-1}\left\{\frac{\omega_y}{\sqrt{\omega_y^2 + \omega_z^2}}\right\} \quad (7)$$

$$\theta_{yss1} = -\tan^{-1}\left\{\frac{\omega_x}{\sqrt{\omega_y^2 + \omega_z^2}}\right\}$$

Notice that the vehicle body global roll and pitch attitudes $\theta_x$ and $\theta_y$ may be related to $\theta_{xss1}$ and $\theta_{yss1}$ as in the following $$\theta_x = \theta_{xss1} - \sin^{-1}\left\{\frac{d\theta_y}{\sqrt{\omega_y^2 + \omega_z^2}}\right\} \quad (8)$$

$$\theta_y = -\tan^{-1}\left\{\frac{\sqrt{\omega_y^2 + \omega_z^2}\tan(\theta_{yss1}) - d\theta_x}{\sqrt{\omega_y^2 + \omega_z^2 - d\theta_y^2}}\right\}$$

and it may be proven that $\theta_x = \theta_{xss1}$ and $\theta_y = \theta_{yss1}$ when $\dot{\theta}_x = 0$ and $\dot{\theta}_y = 0$, i.e., when the body roll and pitch attitudes are in a steady state condition.

If the vehicle's longitudinal velocity $v_x$ is available, then the following two variables may be calculated $$\theta_{yss2} = \sin^{-1}\left(\frac{dv_x - a_x - \omega_z v_{ylin}}{g}\right) \quad (9)$$

$$\theta_{xss2} = \sin^{-1}\left(\frac{a_y - \omega_z v_x - d[v_{ylin}]}{g\cos(\theta_{yss2})}\right)$$

where $v_{ylin}$ is the so-called linear lateral velocity which might be computed from a bicycle model in the following $$v_{ylin} = \frac{-I_z d[\omega_z] + M_z + b_f M[a_y - g\sin(\theta_x)\cos(\theta_y)]}{b_r c_r} v_x \quad (10)$$

where $M_z$ is the yawing moment due to the stability control, which may be estimated based on the desired yawing moment command, the applied brake pressures at each of the calipers and the estimated road surface μ; $I_z$ is the yaw momentum of inertia of the vehicle; M is the vehicle total mass; $b_f$ is the distance from the vehicle center of gravity to the front axle; $b_r$ is the distance from the vehicle center of gravity to the rear axle; and $c_r$ is the sum of the nominal cornering stiffness of the rear tires.

Notice that the vehicle body global roll and pitch attitudes $\theta_x$ and $\theta_y$ may be related to $\theta_{xss2}$ and $\theta_{yss2}$ as in the following $$\theta_y = \sin^{-1}\left(\sin(\theta_{yss2}) - \frac{\omega_z \Delta v_y}{g}\right) \quad (11)$$

$$\theta_x = \sin^{-1}\left(\sin(\theta_{xss2})\frac{\cos(\theta_{yss2})}{\cos(\theta_y)} - \frac{d[\Delta v_y]}{g\cos(\theta_y)}\right)$$

where $$\Delta v_y = v_y - v_{ylin} \quad (12)$$

and $d[\Delta v_y]$ is the time derivative of $\Delta v_y$. It may be proven that $\theta_x = \theta_{xss2}$ and $\theta_y = \theta_{yss2}$ when $\Delta v_y = 0$, i.e., when if the vehicle lateral velocity is the as the computed linear lateral velocity.

Considering the vehicle attitudes are small enough such that the small angle assumption holds, then Equations in (10) can be simplified to the following $$\theta_y = \theta_{yss2} - \omega_z \frac{\Delta v_y}{g} \quad (13)$$

$$\theta_x = \theta_{xss2} - \frac{d[\Delta v_y]}{g}$$

Equations (13) characterize a simplified functional relationship among the unknowns $\theta_x$, $\theta_y$. It is evident that $\theta_x$, $\theta_y$ and $\Delta v_y$ may not be decoupled from accelerations in most situations.

In order to obtain the functional relationship between an individual unknown with the measured signals, the Euler pitch angle equation is used. Considering the vehicle attitude angles are usually small angles, hence the pitch angle velocity can be directly related to the pitch rate sensor signal, the yaw rate sensor signal and the unknown roll attitude $\theta_x$ as in the following:

$$d\theta_y \approx \omega_y - \omega_z \theta_x \quad (14)$$

Plugging into Equation (14) the roll angle computed in Equation (13), the unknown $\theta_x$ is eliminated to obtain $$d\theta_y \approx \omega_y - \omega_z\left(\theta_{xss2} - \frac{\delta[\Delta v_y]}{g}\right) \quad (15)$$

On the other hand, from the pitch computation in (13), the pitch angle velocity is solely related to the unknown $\Delta v_y$ and its time-differentiation $d[\Delta v_y]$, this may be obtained by differentiating the first equation of (13) and expressed in the following:

$$d\theta_y = d\theta_{yss2} - d\omega_z \frac{\Delta v_y}{g} - \omega_z \frac{d[\Delta v_y]}{g} \quad (16)$$

By comparing Equations (15) and (16) and eliminating the unknown $d\theta_y$, an equation with a sole unknown of the lateral velocity difference may be obtained. This is a first order differentiation equation as shown below $$2\omega_z d[\Delta v_y] + d\omega_z \Delta v_y = S_p \quad (17)$$

where $S_p$ is called a sliding index, which is a function of pitch rate, yaw rate, the steady-state roll attitude angle and the steady state pitch roll angle velocity. More specifically, this sliding index may be expressed as $$S_p = (d\theta_{yss2} - \omega_y + \omega_z \theta_{xzz2})g \quad (18)$$

$S_p$ is a function of the lateral and longitudinal accelerations, the vehicle velocity, the yaw rate and the pitch rate but is independent of the roll rate. $S_p$ is calculated from the measured sensor signals and the calculated variables from the measured sensor signals. The magnitude of $S_p$ implies the magnitude of the sideslip tendency of the vehicle, and hence the name sliding index.

On the other hand, if another sliding index may be denoted as $$S_r = (d\theta_{xss2} - \omega_x - \omega_z \theta_{yss2})g \quad (19)$$

through the similar discussion as the above, the lateral velocity difference satisfies the following single differential equation $$d^2[\Delta v_y] - \omega_z^2 \Delta v_y = S_r \quad (20)$$

$S_r$ is a function of the lateral and longitudinal accelerations, the vehicle velocity, the yaw rate and the roll rate but is independent of the pitch rate.

Sensor Plausibility Check

The sensor failures may be detected through sensor self tests and sensor electronic monitoring. Both sensor self test and the sensor electronic monitoring are conducted by checking if the measurement from a sensor of interest is within the sensor specifications which are usually defined through the lower and upper bounds and various change rate limitations of the sensor signal. Since it is possible for a specific sensor to have a failure without violating the sensor specification, it may be desirable to conduct in-spec sensor failure check.

In the following it is assumed that the single failure hypothesis is true, i.e., at any given time instant, there is only one sensor that could be failed. Therefore it might be possible to use the interrelationship among the various vehicle motion states to detect a single "in-spec" sensor failure which obeys the single failure hypothesis. The method using the other sensor signals to check if a specific sensor is in failure mode is called sensor plausibility check.

First, a roll rate sensor plausibility can be determined through the sensors such as a lateral accelerometer, a longitudinal accelerometer, a pitch rate sensor and a yaw rate sensor. There are many methods to conduct the roll plausibility check for example, by comparing the vehicle roll angle computed from roll rate sensor and the roll angle computed from the roll dynamics model of the vehicle body.

Using calculus, the solution for the unknown change in lateral velocity $\Delta v_y$ from (17) which may be expressed as a function of the sliding index $S_p$, the yaw rate sensor signal without using any information from the roll rate sensor is $$\Delta \hat{v}_{yp}(t) = \frac{1}{\sqrt{|\omega_z(t)|}} \int_0^t \frac{S_p(\tau)}{2\sqrt{|\omega_z(\tau)|}} \text{sgn}(\omega_z(\tau)) d\tau \quad (21)$$

With this estimated lateral velocity $\Delta \hat{v}_{yp}$, the roll rate signal may be estimated through the following based on (13) and the general kinematics equation shown in (1)-(6):

$$\hat{\theta}_{x2} = \theta_{xss2} - \frac{d[\Delta \hat{v}_{yp}]}{g} \quad (22)$$

$$\hat{\theta}_{y2} = \theta_{yss2} - \omega_z \frac{\Delta \hat{v}_{yp}}{g}$$

$$\hat{\omega}_x = d[\hat{\theta}_{x2}] - \omega_z \hat{\theta}_{y2}$$

The above computations are valid when the vehicle has both pitch and yaw motion, for example, when the vehicle is braked in a turn.

Then the roll rate sensor measurement $\omega_x$ may be compared against the above estimated roll rate $\hat{\omega}_x$ to determine if the roll rate is plausible. $\omega_z = 0$ (i.e., zero yaw rate case) is a singular point for calculating (21). This singular point could cause numerical discrepancies since a small amount of noise in the involved signals may lead to signal or large errors. Hence in order to make the above approach feasible for a digital implementation, the singular point may be removed. That is, other methods to compute the interested variables when $\omega_z = 0$ may be used.

First, the case where the yaw rate $\omega_z$ approaches zero but the yaw acceleration $\dot{\omega}_z$ is non-zero is considered. This corresponds to the case where the yaw rate crosses zero with certain non-zero yaw acceleration.

$$\Delta v_{yp}(t)|_{\omega_z \to 0} = \lim_{\omega_z \to 0} \frac{\int_0^t \frac{S_p(\tau)}{2\sqrt{|\omega_z(\tau)|}} \text{sgn}(\omega_z(\tau)) d\tau}{\sqrt{|\omega_z(t)|}} \quad (23)$$

$$= \lim_{\omega_z \to 0} \frac{\frac{d}{dt}\left\{\int_0^t \frac{S_p(\tau)}{2\sqrt{|\omega_z(\tau)|}} \text{sgn}(\omega_z(\tau)) d\tau\right\}}{\frac{d}{dt}\left\{\sqrt{|\omega_z(t)|}\right\}}$$

$$= \lim_{\omega_z \to 0} \frac{\frac{S_p(t)}{2\sqrt{|\omega_z(t)|}} \text{sgn}(\omega_z(t))}{\frac{1}{2}\{|\omega_z(t)|\}^{-1/2} d\omega_z(t) \text{sgn}(\omega_z(t))}$$

$$= \frac{S_p(t)}{d\omega_z(t)}$$

The digital implementation of the above study can be summarized as in the following. In the following discussion, the subscript k implies the time instant is $t = k\Delta T$, where $\Delta T$ is the sampling time, k is an integer.

In the case where yaw rate is non-zero, the lateral velocity delta $\Delta v_{y2_{k+1}}$ at the time instant $t = (k+1)\Delta T$ is a function of the sliding index $S_{p_{k+1}}$ and the yaw rate $\omega_{z_{k+1}}$. The following iterative algorithm captures such relationship and the way to calculate $\Delta v_{yp_{k+1}}$ $$x_{k+1} = x_k + \frac{S_{p_{k+1}} \text{sgn}(\omega_{z_{k+1}})}{2\sqrt{|\omega_{z_{k+1}}|}} \Delta T \quad (24)$$

$$\Delta v_{yp_{k+1}} = \frac{x_{k+1}}{\sqrt{|\omega_{z_{k+1}}|}}$$

where the sign function sgn(•) is defined in the following $$\text{sgn}(\omega_{k+1}) = \begin{cases} 1 & \text{if } \omega_{k+1} \geq 0 \\ -1 & \text{if } \omega_{k+1} < 0 \end{cases} \quad (25)$$

In the case of the yaw rate $\omega_{z_{k+1}}$ approaching zero with non-zero sequential difference $\Delta\omega_{z_{k+1}}$, the lateral velocity delta $\Delta v_{yp_{k+1}}$ of the vehicle is a function of the sliding index and the sequential difference $\Delta\omega_{z_{k+1}}$ of the measured yaw rate signals as set forth in the following:

$$\Delta\omega_{z_{k+1}} = \omega_{z_{k+1}} - \omega_{z_k} \quad (26)$$

$$\Delta v_{yp_{k+1}} = \frac{S_{p_{k+1}}}{\Delta\omega_{z_{k+1}}} \Delta T$$

If both the measured yaw rate $\omega_{z_{k+1}}$ and its sequential difference $\Delta\omega_{z_{k+1}}$ approach zero, then yaw rate and yaw acceleration are close to zero. That is, the vehicle does not have any yaw motion. In this case the vehicle lateral velocity $\Delta v_{yp_{k+1}}$ could be set to zero.

Using the above-calculated lateral velocity $\Delta v_{yp_{k+1}}$, the vehicle pitch attitude angle $\theta_{y2_{k+1}}$ may be calculated from current value of the steady state pitch angle $\theta_{yss2_{k+1}}$ and the current value of the measured yaw rate $\omega_{z_{k+1}}$. Those current digital values obey the second Equation of (22) in the following digital form $$\theta_{y2_{k+1}} = \theta_{yss2_{k+1}} - \omega_{z_{k+1}} \frac{\Delta v_{yp_{k+1}}}{g} \quad (27)$$

Similarly the following roll angle may be obtained $$\theta_{x2_{k+1}} = \theta_{xss2_{k+1}} - \frac{1}{g} \frac{d[\Delta v_{yp_{k+1}}]}{\Delta T} \quad (28)$$

The unknown roll rate $\omega_{x_{k+1}}$ of the vehicle can be calculated from the roll attitude angle $\theta_{x2_{k+1}}$, the current value of the sequential difference $\Delta\theta_{x2_{k+1}}$ of this calculated roll attitude angle, the current value of the measured pitch rate $\omega_{y_{k+1}}$ and the current value of the measured yaw rate $\omega_{z_{k+1}}$ is set forth in the following:

$$\Delta\theta_{x2_{k+1}} = \theta_{x2_{k+1}} - \theta_{x2_k} \quad (29)$$

$$\omega_{x_{k+1}} = \frac{\Delta\theta_{x2_{k+1}}}{\Delta T} + \omega_{z_{k+1}} \theta_{y2_{k+1}}$$

By using the equation (20) and its solution, $\Delta v_{yr}$ may be obtained which is independent of the pitch rate. The corresponding estimated attitudes are denoted as $\theta_{x3}$ and $\theta_{y3}$. The pitch rate signal may be calculated in the following $$\hat{\theta}_{x3} = \theta_{xss2} - \frac{d[\Delta\hat{v}_{yr}]}{g} \quad (30)$$

$$\hat{\theta}_{y3} = \theta_{yss2} - \omega_z \frac{\Delta\hat{v}_{yr}}{g}$$

$$\hat{\omega}_y = d[\hat{\theta}_{y3}] + \omega_z \hat{\theta}_{x3}$$

the sensor measurement $\omega_y$ may then be compared against the computed $\hat{\omega}_y$ to make a decision about whether the pitch rate sensor is plausible.

Global Attitude Determination

The vehicle body's global attitudes may be determined in steady state conditions as $\theta_{xss1}$, $\theta_{yss1}$ in (7) or as $\theta_{xss2}$, $\theta_{yss2}$ in (9). The steady state conditions may then be characterized. That is, if $$\Pi_1 = \frac{d\theta_{xss1}}{dt}, \Xi_1 = \frac{d\theta_{yss1}}{dt} \quad (31)$$

then the computation of $\theta_{xss1}$ in (7) accurately reflects the true roll attitude of the vehicle when the following is true $$\Pi_1 = 0 \quad (32)$$

and the computation of $\theta_{yss1}$ in (7) accurately reflects the true vehicle pitch attitude when the following is true $$\Xi_1 = 0 \quad (33)$$

If the vehicle's steering input velocity $d\delta_s$ is limited under a certain threshold, the vehicle yaw rate $\omega_z$ is limited under a certain threshold and the vehicle's lateral acceleration is under certain threshold, then the vehicle's delta lateral velocity is close to zero, i.e., $$\Delta v_y = v_y - v_{ylin} = 0 \quad (34)$$

which implies that the lateral velocity of the vehicle is the same as the linear lateral velocity of the vehicle calculated from the linear bicycle model as in (10). Then, computation in (9) may be used to characterize the vehicle body's global roll and pitch angles. Notice that the aforementioned conditions might not be steady state conditions, but might be rather non-aggressive dynamic conditions where the vehicle's dynamics are in the linear range. Such conditions are related to the driving conditions of mild driver steering inputs and normal road surface conditions. The following series of functional conditions may be used to describe the aforementioned driving conditions $$\Psi_i(d\delta_s, \omega_z, a_y, v_x) \leq \gamma_i \quad (35)$$

where i=1, 2, ..., l; $\Psi_i(\bullet)$ is the ith scalar function and $\gamma_i$ is a constant which is the ith threshold.

The reference lateral velocity of the vehicle is denoted as $v_{yref}$, whose computation will be discussed in the next section. The vehicle reference global attitudes may then be calculated as $$\theta_{yref} = \theta_{yss2} - \omega_z \frac{\Delta v_{yref}}{g} \quad (36)$$

$$\theta_{xref} = \theta_{xss2} - \frac{d[\Delta v_{yref}]}{g}$$

which is calculated continuously especially when the conditions for $\theta_{xss1}$, $\theta_{yss1}$ and $\theta_{xss2}$, $\theta_{yss2}$ are not satisfied.

Now the feedback error term is constructed for the roll attitude as in the following $$\Theta_{xerr} = \kappa_1(\Pi_1)(\theta_y - \theta_{yss1}) + \kappa_2(\Psi)(\theta_y - \theta_{yss2}) + \kappa_{ref}(\theta_y - \theta_{yref}) \quad (37)$$

The feedback error term for the pitch attitude is set forth in the following $$\Theta_{yerr} = \pi_1(\Pi_1)(\theta_y - \theta_{yss1}) + \pi_2(\Psi)(\theta_y - \theta_{yss2}) + \pi_{ref}(\theta_y - \theta_{yref}) \quad (38)$$

Then the feedback adjusted roll attitude velocity and the feedback adjusted pitch attitude velocity may be calculated as in the following $$d\theta_{xfdbk} = \omega_x + [\omega_y \sin(\theta_x) + \omega_z \cos(\theta_x)] \tan(\theta_y) + \Theta_{xerr}$$

$$d\theta_{yfdbk} = \omega_y \cos(\theta_x) - \omega_z \sin(\theta_x) + \Theta_{yerr} \quad (39)$$

The vehicle global roll attitude may now be obtained as in the following $$\Theta_{xerr_{k+1}} = \kappa_{1_{k+1}}(\Pi_{1_{k+1}})(\theta_{x_k} - \theta_{xss1_{k+1}}) + \kappa_{2_{k+1}}(\Psi_{k+1})(\theta_{x_k} - \theta_{xss2_{k+1}}) + \kappa_{ref_{k+1}}(\theta_{x_k} - \theta_{xref_{k+1}})$$

$$d\theta_{xfdbk_{k+1}} = \omega_{x_{k+1}} + [\omega_{y_{k+1}} \sin(\theta_{x_k}) + \omega_{z_{k+1}} \cos(\theta_{x_k})] \tan(\theta_{y_k}) + \Theta_{xerr_{k+1}}$$

$$\hat{\theta}_{x_{k+1}} = \hat{\theta}_{x_k} + d\theta_{xfdbk_{k+1}} \Delta T$$

$$\hat{\theta}_x(0) = \theta_{xss2}(0) \quad (40)$$

The vehicle global pitch attitude may now be obtained as in the following $$\Theta_{yerr_{k+1}} = \pi_{1_{k+1}}(\Pi_{1_{k+1}})(\theta_{y_k} - \theta_{yss1_{k-1}}) + \pi_{2_{k+1}}(\Psi_{k+1})(\theta_{y_k} - \theta_{yss2_{k+1}}) + \pi_{ref_{k+1}}(\theta_{y_k} - \theta_{yref_{k+1}})$$

$$d\theta_{yfdbk_{k+1}} = \omega_{y_{k+1}} \cos(\theta_{x_k}) - \omega_{z_{k+1}} \sin(\theta_{x_k}) + \Theta_{yerr_{k+1}}$$

$$\hat{\theta}_{y_{k+1}} = \hat{\theta}_{y_k} + d\theta_{yfdbk_{k+1}} \Delta T$$

$$\hat{\theta}_y(0) = \theta_{yss2}(0) \quad (41)$$

Reference Signal Generator

The reference signals defined in this invention are those variables which may be used to capture some portion of the real value of the interested variables. For example, the low frequency portion of a signal. In the aforementioned attitude computation, the reference lateral velocity $v_{yref}$ is already used. Another reference variable is the reference longitudinal velocity, which is determined based on the four-wheel speed sensor signals.

Notice that, when the vehicle pitch rate is large enough, Equation (17) provides a good characterization of the lateral velocity $v_y$. Similarly when the vehicle yaw rate is large enough, Equation (20) provides a good characterization of $v_y$. In order to utilize both Equation (17) and Equation (20) and the bicycle model based linear velocity $v_{ylin}$, a blending equation is obtained by adding a production of a gain $\rho$ and Equations (17) to (20), and adding an error term $\lambda(v_{ylin} - v_{yref})$ as in the following $$d^2[v_{yref}] + 2\omega_z \rho d[v_{yref}] + (\lambda + \rho \dot{\omega}_z - \omega_z^2) v_{yref} = S_r + \rho S_p + \lambda v_{ylin} \quad (42)$$

where the gains $\rho$ and $\lambda$ are two positive numbers, that are adjusted to the measured and computed variables such as the yaw rate, the pitch rate, the roll rate, the lateral acceleration, the driver's steering input, the vehicle's speed. Equation (42) may be used to calculate $v_{yref}$ as in the following digital format $$\gamma_{k+1} = S_{r_{k+1}} + \rho_{k+1} S_{p_{k+1}} + \lambda_{k+1} v_{ylin_{k+1}} - 2\omega_{z_{k+1}} \rho_{k+1} dv_{ref_k} - (\lambda_{k+1} + \rho_{k+1} \omega_{z_{k+1}} - \omega_{z_{k+1}}^2) v_{yref_k}$$

$$dv_{yref_{k+1}} = dv_{yref_k} + \gamma_{k+1} \Delta T$$

$$v_{yref_{k+1}} = v_{yref_k} + dv_{yref_{k+1}} \Delta T$$

$$v_{yref_0} = 0 \quad (43)$$

Relative Attitude

The relative roll attitude angle of a vehicle body with respect to the average road surface is related to the sensor signals through suspensions. There are two external moments applied to the vehicle body: the moment due to vertical suspension forces, denoted as $M_{susp}$ and the moment due to lateral tire force, denoted as $M_{latforce}$. A simple model may be used to describe the roll dynamics of a vehicle body. If the relative roll angle is $\theta_{xr}$, the total vehicle suspension roll spring rate is $K_{roll}$ and the total vehicle suspension roll damping rate is $D_{roll}$, then the roll moment induced by the vertical suspension forces may be written as $$M_{susp} = K_{roll}\theta_{xr} + D_{roll}d\theta_{xr} \quad (44)$$

and if $M_{susp}/K_{roll}$ can be calculated, then the relative roll angle $\theta_{xr}$ could be obtained by passing this scaled vertical suspension force-induced roll moment to a first order filter.

Through Newton's laws, the following differential equation is true $$I_x d\omega_x = M_{latforce} - M_{susp} \quad (45)$$

where $I_x$ is the roll inertia moment of the vehicle body with respect to an axis parallel to the vehicle forward direction but passing the center of gravity of the vehicle body (only sprung mass), $\omega_x$ is the vehicle roll angular rate. Therefore if $M_{latforce}$ is known, then the scaled vertical suspension force-induced roll moment $M_{susp}/K_{roll}$ may be computed from (45).

As in the above, $M_{latforce}$ might be calculated based on sensor measurements and the calculated variables. The total lateral force applied to the vehicle body is generated from the lateral tire forces through suspensions. This total lateral force generates a lateral acceleration, which is measured by the acceleration sensor mounted on the center of gravity of the vehicle body. The variable $a_y$ is the lateral acceleration of the vehicle body center of gravity, $M_s$ is the vehicle sprung mass. The moment applied to the vehicle body due to lateral tire forces may be expressed as $$M_{latforce} = M_s a_y h_{cg} \quad (46)$$

where $h_{cg}$ is the vertical displacement of the center of gravity of the vehicle body with respect to the floor of the vehicle. Inserting (46) to (45), the normalized vertical suspension force-induced roll moment may be computed as the following:

$$NM_{roll} = \alpha a_y - \beta d\omega_x \quad (47)$$

where the coefficients $\alpha$ and $\beta$ are related to the vehicle parameters as in the following:

$$\alpha = \frac{M_s h_{cg}}{K_{roll}}, \beta = \frac{I_x}{K_{roll}} \quad (48)$$

Thus, α and β need to be calculated in a practical implementation. Since the vehicle parameter $M_s$, $I_x$ and $K_{roll}$ are all varied, an accurate relative roll angle is possible if those parameters are reflected accurately in a real-time computation.

Notice that the vehicle inertia parameters like sprung mass $M_s$ and roll moment of inertia $I_x$ can be actually estimated based on the sensor signals in the ISS. Also, notice that the roll moment of inertia is related to the sprung mass through a rotation radius $$r_x I_x = M_s r_x^2 \tag{49}$$

hence the two coefficients α and β can be expressed as proportional to the estimated vehicle sprung mass $\hat{M}_s$. The estimated vehicle sprung mass is an output from the VPD (vehicle parameter determination) unit 92 in ISS system. Also, consider that $K_{roll}$ is related to the suspension stiffness, and the suspension stiffness is usually nonlinear with respect to the suspension relative displacement, hence there is a lookup table in a memory of the device such that $$K_{roll} = \text{lookup\_table}(z_{sh}) \tag{50}$$

where $z_{sh}$ indicates the suspension relative displacement. A rough characterization may be developed so that lateral acceleration is used to replace suspension displacement in (50)

$$K_{roll} = \text{lookup\_table}(a_y) \tag{51}$$

Based on the above discussion, α and β can be expressed from the following lookup tables $$\alpha = \hat{M}_s \text{lookup\_table}_\alpha(a_y)$$

$$\beta = \hat{M}_s \text{lookup\_table}_\beta(a_y) \tag{52}$$

The normalized roll angle may be determined in step 166 using Equation (53) with the calculated $NM_{roll}$ using the lookup table calculated coefficients α and β, (44) can be used to solve for relative roll angle. Such relative roll angle satisfies $$\theta_{xr} + \frac{D_{roll}}{K_{roll}} d\theta_{xr} = NM_{roll} \tag{53}$$

Taking Laplace transformation on both sides of (53) leads to $$\theta_{xr}(s) = T_{ROLL}(s) NM_{roll}(s) \tag{54}$$

where the transfer function is $$T_{ROLL}(s) = \frac{K_{roll}}{K_{roll} + D_{roll} s} \tag{55}$$

A digital version of the computation for the relative roll angle can be expressed as in the following $$\theta_{xr}(k+1) = p_{rd}\theta_{xr}(k) + p_{rn}[NM_{roll}(k+1) + NM_{roll}(k)] \tag{56}$$

Notice that such a calculated relative roll angle is an accurate indication of the vehicle body with respect to the average surface regardless if the vehicle is driven on a level ground or a banked/sloped road, and when there are no lifted wheels. A vehicle system may be controlled in response to the relative roll angle.

The relative pitch computation may be similarly performed. There are two external moments applied to the vehicle body to balance the vehicle pitch motion: the moment due to vertical suspension forces, denoted as $M_{susp}$ and the moment due to lateral tire force, denoted as $M_{longforce}$. If the relative pitch angle is $\theta_{yr}$, the total vehicle suspension pitch spring rate is $K_{pitch}$ and the total vehicle suspension pitch damping rate is $D_{pitch}$, then the moment induced by the vertical suspension forces can be written as $$M_{susp} = K_{pitch}\theta_{yr} + D_{pitch} d\theta_{yr} \tag{57}$$

If the scaled moment $M_{susp}/K_{pitch}$ may be calculated, then the relative pitch angle $\theta_{yr}$ could be obtained by passing this scaled vertical suspension force-induced pitch moment to a first order filter same as in the relative roll angle computation.

The two moments must satisfy the following:

$$M_{longforce} - M_{susp} = I_y d\omega_y \tag{58}$$

Therefore, if $M_{longforce}$ is known, the scaled vertical suspension force-induced pitch moment $M_{susp}/K_{pitch}$ can be computed from (58) since the pitch rate signal is available.

$M_{longforce}$ may be determined based on the sensor measurements or the calculated variables. The total longitudinal force applied to the vehicle body is generated from the longitudinal tire forces through suspensions. This total longitudinal force generates a longitudinal acceleration, which is measured by the acceleration sensor mounted on the center of gravity of the vehicle body. If the longitudinal acceleration of the vehicle body center of gravity is $a_x$, $M_s$ is the vehicle sprung mass, then the moment applied to the vehicle body due to longitudinal tire forces can be expressed as $$M_{longforce} = M_s a_x h_{cg} \tag{59}$$

where $h_{cg}$ is the vertical displacement of the center of gravity of the vehicle body with respect to the floor of the vehicle. Hence, the normalized vertical suspension force-induced pitch moment may be computed as the following $$NM_{pitch} = \delta a_x - \epsilon d\omega_y \tag{60}$$

where $$\delta = \frac{M_s h_{cg}}{K_{pitch}}, \; \varepsilon = \frac{I_y}{K_{pitch}} \tag{61}$$

Notice that due to suspension geometry, the suspension pitch stiffness $K_{pitch}$ is usually different for acceleration versus deceleration of the vehicle and may be expressed as in the following based on the vehicle's acceleration trend (accelerating vehicle would be ($a_x > 0$)

if ($a_x > 0$)

$$NM_{pitch} = \delta_{acc} a_x - \epsilon_{acc} \dot{\omega}_y$$

else $$NM_{pitch} = \delta_{dec} a_x - \epsilon_{dec} \dot{\omega}_y; \tag{62}$$

Similar to the relative roll computational case, lookup tables will be used to compute the four coefficients $\delta_{acc}$, $\delta_{dec}$, $\epsilon_{acc}$ and $\epsilon_{dec}$ as in the following:

$$\delta_{acc} = \hat{M}_s \text{lookup\_table}_{\delta_{acc}}(a_x)$$

$$\delta_{dec} = \hat{M}_s \text{lookup\_table}_{\delta_{dec}}(a_x)$$

$$\epsilon_{acc} = \hat{M}_s \text{lookup\_table}_{\epsilon_{acc}}(a_x)$$

$$\epsilon_{dec} = \hat{M}_s \text{lookup\_table}_{\epsilon_{dec}}(a_x) \tag{63}$$

Thus, using the coefficients and Equation (62) the normalized vertical suspension force induced pitch moment $NM_{pitch}$ may be determined. Using the calculated normalized $NM_{pitch}$ based on the longitudinal acceleration, the pitch rate and the coefficients calculated from the lookup tables in (63), the relative pitch angle may be determined as $$\theta_{yr}(s) = T_{PITCH}(S) NM_{pitch}(s) \quad (64)$$

where the transfer function is $$T_{PITCH}(s) = \frac{K_{pitch}}{K_{pitch} + D_{pitch} s} \quad (65)$$

The digital version of the above computation may be expressed as in the following $$\theta_{yr}(k+1) = p_{pd}\theta_{yr}(k) + p_{pn}[NM_{pitch}(k+1) + NM_{pitch}(k)] \quad (66)$$

Notice that such a calculated relative pitch angle is an accurate indication of the vehicle body with respect to the average surface regardless if the vehicle is driven on a level ground or a banked/sloped road, and when there are no lifted wheels. As mentioned above, the vehicle system may include a safety system or other vehicle system. Safety systems may include a yaw control system or a rollover control system. Of course, more than one system may be controlled at a time.

Integrated Vehicle Control Systems

Figure 11:
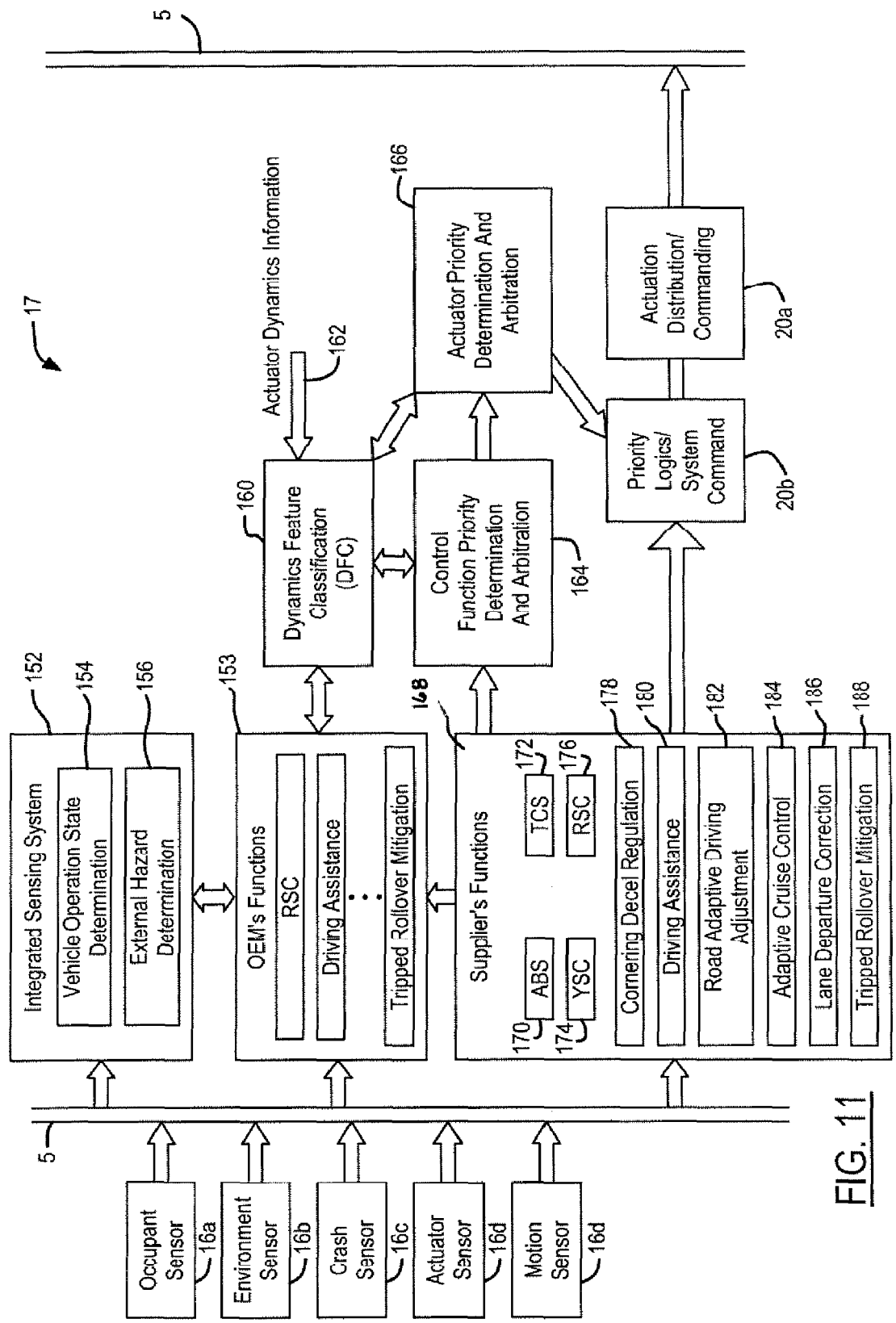
FIG. 11 is a block diagram of a supplier/OEM priority system.

Referring now to FIG. 11, the integrated vehicle control module 17 of FIG. 2 is illustrated in further detail. The integrated vehicle control module 17 may be coupled to the integrated sensor group 16d, which includes sensors 16a-16e depicted in FIG. 11 through a vehicle bus 5. The integrated vehicle control module 17 includes a number of sensing algorithms and a collection of feedback control algorithms which perform multiple control functions by activating available actuators based on the variables calculated in the sensing algorithms. The sensing algorithms receive the available sensor signals or the past values of the calculated variables to characterize the interaction among the driver, the vehicle and the external environment of the vehicle including the road and other moving and non-moving objects.

The integrated vehicle control module 17 includes an integrated sensing system 152. The integrated sensing (ISS) system 152 has various sensing algorithms therein. The integrated sensing system 152 identifies the vehicle's operational states and the driver's intention during travel using a vehicle operation state determination 154. An external hazard determination is provided by external hazard determination 156. The vehicle operation state determination 154 and external hazard determination 156 are coupled together. Based upon the information processed and calculated from the integrated sensing system 152, the vehicle dynamics features such as controllability and stability may be readily determined.

Various OEM's functions 153 such as RSC, driving assistance and tripped rollover mitigation may be coupled to the integrated sensing system 152. The determination of the controllability and stability is performed in a dynamics feature classification module 160. The dynamics feature classification 160 will also involve information from the sensor measurements or the calculated variables from the measurements regarding actuator specific dynamics as illustrated by arrow 162. The information processed in the dynamics feature classification module 160 is coupled to the control function priority determination and arbitration module 164 and the actuation priority determination and arbitration module 166.

A collection of control functions from the auto suppliers resides in a control module 168. It is illustrated coupled to the OEM's functions 153 and ultimately to the integrated sensing system 152, the dynamics feature classification 160, and a control function priority determination and arbitration block 164. The supplier's control function module 153 receives signals from the various sensors, the integrated sensing system 152, and the dynamics feature classification 160. Based upon those signals, the necessary feedback control commands in the vehicle level or actuator level may be provided in both function module 153 and 168. Vehicle level control may, for example, comprise controlling the roll moment in a roll stability control system. Actuator level control, for example, may comprise controlling the anti-lock brake system. The supplier's control function module 168 is a broad category for an anti-lock brake system 170, the traction control system 172, a yaw stability control system 174, a roll stability control system 176, cornering deceleration regulation unit 178, driving assistance unit 180, road adaptive driving adjustment unit 182, an adaptive cruise control unit 184, lane departure correction unit 186, and tripped rollover mitigation unit 188. Of course, various other functions may be evident to those skilled in the art.

The supplier's control function module 168 may be coupled to priority logic system command module 20b and actuation and distribution command module 20a as set forth in FIG. 2. Also, box 20b may be coupled to an actuator priority determination and arbitration module 166. Notice that the suppliers are responsible for the control logic in 20a and 20b.

The vehicle level control from both the OEM's control function module 153 and the supplier's control function module 168 may, for example, be the total yaw moment for counteracting the vehicle's yaw motion or the total roll moment for counteracting the vehicle's roll motion. If multiple actuators are involved in a control function, the vehicle level control command may be decomposed into actuator level commands such that the vehicle level control may best be achieved, when the involved actuators activate according to the demanded actuator level commands in a coordinated way. The vehicle level control command may come from different function requests. A function decomposition may be used and may include control functions of significance for the vehicle dynamics and controls.

The dynamics feature classification (DFC) unit 160 may determine that the vehicle operates under controllable dynamics. If so, both 153 and 168 may request one or more feedback control commands such as roll moment feedback (vehicle level command for rollover protection), pitch moment feedback (vehicle level command for pitchover prevention), yaw moment feedback (vehicle level command for spin-out prevention), lateral acceleration regulation (vehicle level command), longitudinal acceleration regulation (vehicle level command), sideslip angle regulation (vehicle level command for vehicle lateral sliding prevention), and longitudinal slip regulation (actuator level command). During unstable vehicle dynamics, both unit 153 and unit 168 are likely to compute several control commands. For example, an aggressive steering induced rollover event may start from a large yaw motion of the vehicle and then develop into a larger roll motion and a potentially larger lateral sliding. Coordination, prioritization, and arbitration of those different control demands may be required in block 164. On the other hand, when the vehicle is equipped with multiple electronic control systems such as multiple actuators, each may be requested for achieving various functions. There is also a need to prioritize or arbitrate among those actuators to achieve the desired vehicle level control command in block 166. For example, controlled brakes, controlled anti-roll-bar, controlled front wheel steering, and controlled rear wheel steering may all be used to perform certain roll stability control functions. Actuator priority determination and arbitration unit 166 is dedicated to determine the proper actuators to most effectively realize the vehicle control command received from the control function priority determination and arbitration unit 164. The integrated vehicle control module commands the individual control modules to achieve the command. In this way the integrated vehicle control module 17 (FIG. 1) acts as a local controller. For example, the RSC function in the integrated control module 17 generates a counteracted roll moment and a control command in terms of caliper pressure at certain brake locations. When the specified brake system control has to achieve the pressure command based upon its hydraulics, local actuator information like measured or estimated caliper pressure, the brake hydraulic control unit shown in FIG. 4 are modified such that the brake pressure command can be followed by the brake caliper or calipers through a closed loop strategy. Based upon the input from the integrated sensing system 152, the OEM's module control function 153 and the supplier's control function module 168, the function priority determination and arbitration unit 164, and the actuator priority determination and arbitration 166, the information of the actuators dynamics which are specified by various actuator units, the dynamics feature classification module 160 determines whether the vehicle is operating under stable or unstable dynamics, or controllable or uncontrollable dynamics conditions. It also establishes appropriate control threshold values for various combinations of the stability and controllability using stable, unstable but controllable, unstable and uncontrollable dynamics conditions.

Figure 12:
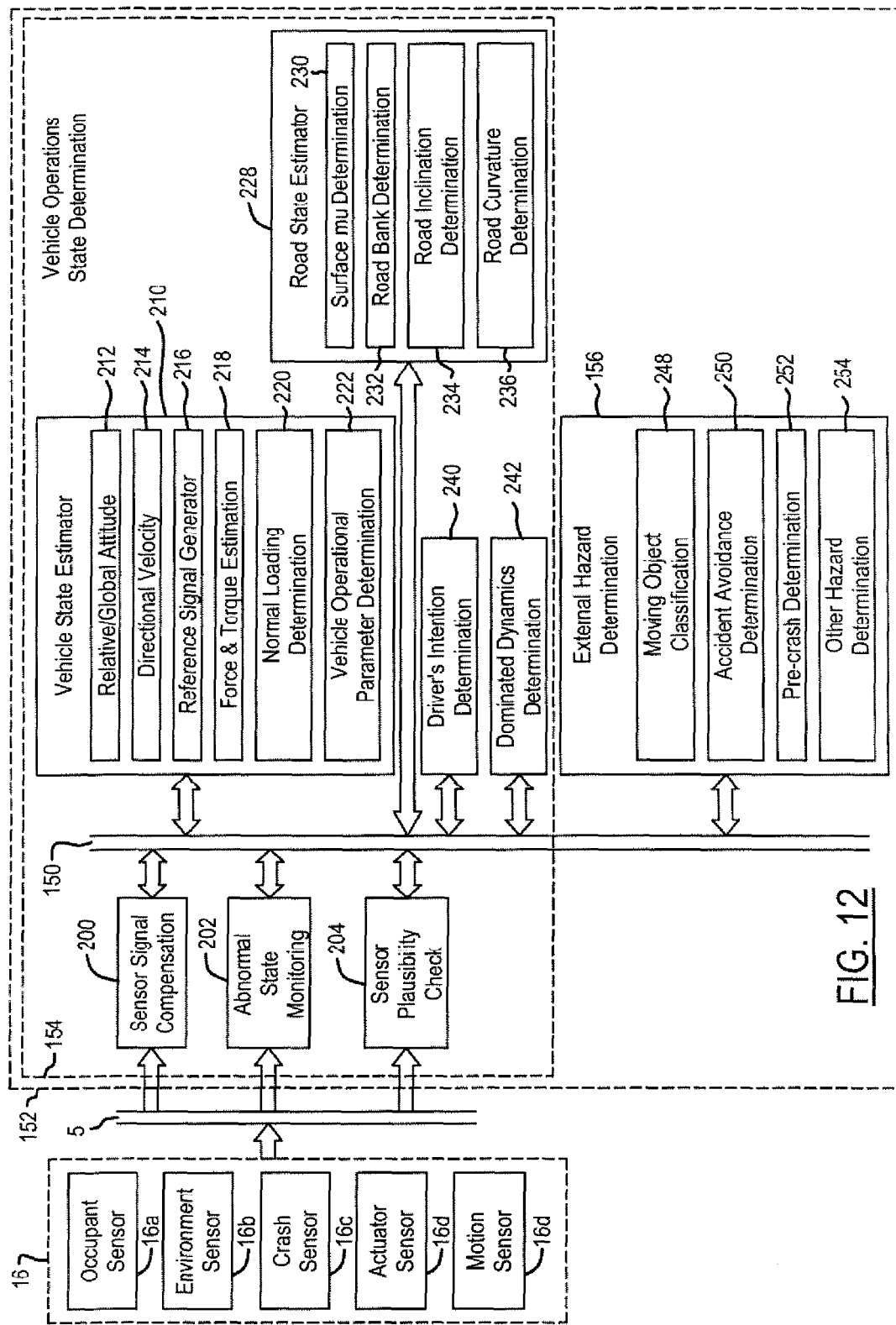
FIG. 12 is a block diagram of a vehicle operations state according to FIG. 11.

Referring now to FIG. 12, the integrated sensing system 152 of FIG. 2 is illustrated in further detail.

The vehicle operation state determination 154 may include sensor signal compensation 200, abnormal state monitoring 202, and a sensor plausibility check 204. The sensor signal compensation, abnormal state monitoring and sensor plausibility check are used to correct and adjust the various sensor signals. The output of the sensor signal compensation 200, abnormal state monitoring 202, and sensor plausibility check 204 may be coupled to a vehicle state estimator 210. The vehicle state estimate includes a vehicle global and relative attitude determination 212. The relative/global attitude determination 212 may be characterized by the vehicle body Euler angles with respect to sea level or with respect to the average road surface. A directional vehicle velocity block 214 is used to determine the absolute vehicle velocity projected along the vehicle body fixed longitudinal and latitudinal direction. A vehicle reference signal generator 216 may also be included in the vehicle state estimator 210.

The vehicle state estimator 210 may also include a force and torque estimation block 218 that estimates the forces and torques acting on the vehicle. A normal loading determination 220 determines the normal loading acting at each of the wheels of the vehicle. A vehicle operational parameter determination 222 may also be provided within the vehicle state estimator 210. The vehicle operational parameter determination 222 may include the determinations of the vehicle loading, tire rolling radii, vehicle mass, and various other parameters.

A road state estimator 228 may also be coupled within the vehicle operation state determination 154. The road state estimator 228 is illustrated coupled to an internal data communication mechanism 150. The road state estimator 228 may include a surface friction determination 230 that generates a signal corresponding to the road surface friction level. Surface friction is sometimes referred to as surface mu (μ). A road bank determination unit 232 may also be provided within the road state estimator 228. The road bank determination unit 232 determines the bank angle of the road on which the vehicle is driven. The bank angle of the road is the lateral or sideways angle of the road in a direction perpendicular to the normal or intended travel direction of the road.

A road incline determination 234 is also provided within the road state estimator 228. The inclination determination 234 determines the angular inclination of the road in the direction of normal vehicle travel on the road.

A road curvature determination 236 may also be provided within the road estimator block 228. The road curvature determination determines the radius of curvature of the road on which the vehicle is traveling. The road curvature information may be coupled to the environmental sensors such as external cameras used in active cruise control (ACC) or pre-crash sensing. Sometimes, GPS information may be used to extract the road curvature information.

The vehicle operational state determination 154 may include a driver's intention determination block 240. The driver's intention determination block 240 may provide an indication as to the desired vehicle motion path or the desired vehicle moving rate (such as the desired yaw rate of the vehicle) from the driver. A dominated dynamics determination block 242 may also be coupled to the internal data communication mechanism 150 and receive various information therefrom. The dominated dynamics determination unit 242 is used to classify the main control direction of the vehicle dynamics if there are multiple functions requested at the same time. For example, if a roll dominated motion is set forth, roll stability control is likely to provide a majority control in order to control the roll motion of the vehicle. Although the single dominated vehicle dynamics is possible, many times the vehicle operates under combined dynamics. For example, a large vehicle yawing on a high friction road surface may cause a large roll motion. In this case, it may be possible for both yaw stability control and roll stability functions to request control at the same time. Therefore, it is important to assess which should be classified as the dominated control direction.

External hazard determination 156 of the integrated sensing system 152 is also illustrated in FIG. 12. The external hazard determination block includes a moving object classification 248, an accident avoidance determination 250, a pre-crash determination 252, and another unit 254 which takes care of detecting all the other hazards. Based upon the various inputs from the cameras and the like, a moving object may be classified into one of a number of predetermined categories, including a vehicle or size of vehicle and the direction of the vehicle. An accident avoidance determination may be made based upon the dynamic conditions in the heading of both the host vehicle and a target vehicle. A pre-crash determination determines whether or not a collision is predictable.

Referring now to FIG. 13, the method of the present invention related to the integrated vehicle control module 17 begins in start block 300. In step 302, signals from the various sensors are received. In step 304, the magnitude of the lateral acceleration of the vehicle is checked. If it exceeds a lateral acceleration threshold, step 400 will be executed, otherwise, step 306 is executed. In step 306, the magnitude of the longitudinal acceleration is checked. If the longitudinal acceleration exceeds the longitudinal acceleration threshold, step 400 will be conducted, otherwise, step 308 will be conducted. In step 308, the magnitude of the roll rate is checked with respect to a roll rate threshold. If it exceeds the roll rate threshold, step 400 will proceed, otherwise, step 310 will be executed. In step 310, the magnitude of yaw rate is checked. If the yaw rate exceeds the yaw rate threshold, then step 400 will be executed, otherwise, step 312 will be executed. Notice that the above steps aim to single out the extreme vehicle dynamics which are associated with crash or collision. For those skilled in the art, it is not hard to find that other schemes may be possible which may involve checking the magnitude of the combined accelerations or angular rates or may involve using both environmental sensor signals from 16*b* and crash sensor signals from 16*c* in FIG. 2 to conduct such predetermination of crash or collision vehicle dynamics.

After step 310, a sensor plausibility check 312 is conducted for roll rate sensor, pitch rate sensor, yaw rate sensor, longitudinal accelerometer, lateral accelerometer, vertical accelerometer or subsets of this six types of sensors. The algorithm used in this block may be, but is not limited to those described in the sensor plausibility check section of this invention. In step 314, if the sensor signals are not plausible, step 316 is executed in which sensor fault processing logic is performed. Otherwise, sensor signal compensation 318 is performed. Sensor signal compensation may include compensating the sensor signals for various offsets including temperature dependent sensor drift compensation, resting sensor offset compensation and dynamic sensor offset compensation. Sensor signal compensation performed in 318 might also include the sensor misalignment compensation (one method for performing such compensation can be found in U.S. Pat. No. 6,782,315) and the sensor noise compensation. In step 320, the vehicle's relative attitudes are determined. In step 322, the vehicle linear lateral velocity is computed based on a linear (may be time varying) lateral dynamics model of the vehicle, such as the computation using (10). Such a linear lateral velocity may also be obtained through the vehicle's true tire lateral forces and the tire cornering stiffness coefficients. The true tire forces might be also determined in the force and torque estimation module 218 shown in FIG. 12, which is beyond the bicycle model used in (10).

In step 324, two sliding indexes as defined in (18) and (19) are calculated. Such sliding indexes are calculated based on relationship (9) and roll, pitch and yaw angular rate signals. Based on those two sliding indexes and the two ordinary differential equations defined in (17) and (20), a reference lateral velocity of the vehicle may be obtained in step 326 by using (43). In step 328, the global roll and pitch angles of the vehicle are calculated, and the vehicle directional velocities are then computed in step 330. After step 330, it arrives at node 340.

The details of step 320 can be further depicted in FIG. 14. It starts in step 320*a* where it receives sensor signals and the calculated signals, or the past values of the interested variables. In step 320*b* and 320*c*, the roll gradient $\alpha$ and the roll acceleration coefficient $\beta$ are determined which are either computed through prescribed lookup tables as in (52) using formulas in (48), or they are adaptively computed in real time by compensating the vehicle loading changes as in U.S. patent application Ser. No. 10/966,395 filed Oct. 15, 2004, and incorporated by reference herein. In step 320*d*, the normalized roll moment is computed as in (47). Such a normalized roll moment is then passed through a filter shown in (31) and the final relative roll angle is obtained as in step 320*e*.

After the relative roll angle is estimated, the relative pitch angle is computed as shown in FIG. 15. In step 320*f*, the longitudinal acceleration is checked to see if the vehicle is accelerating or decelerating. If the vehicle is accelerating, step 320*g* is performed where the pitch gradient the pitch acceleration coefficient for an accelerating vehicle are determined. They may be computed through prescribed lookup tables as in (63) using formulas in (61), or they may be adaptively computed in real time by compensating the vehicle loading changes as in U.S. patent application Ser. No. 11/010, 863, filed Dec. 13, 2004, and incorporated by reference herein. At step 320*i*, the final pitch gradient and the final pitch acceleration coefficient are set. In step 320*j*, the normalized pitch moment is determined as in (38). The normalized pitch moment is then filtered as shown in (41) to obtain the final relative pitch in step 320*k*.

If the vehicle is decelerating, step 320*h* is conducted where the pitch gradient and the pitch acceleration coefficient for a decelerating vehicle are determined. The values may be passed through a first order filter which reflects the roll damping model through Equations (48) and (52). The above estimated variables may be used as feedback to the vehicle dynamics control systems to achieve the vehicle yaw stability control, the vehicle sideslip control, and the vehicle roll stability control.

The details of step 326 are further described in FIG. 16, where in step 326*a*, an adaptive gain $\rho$ is adjusted based on the vehicle driving conditions. In step 326*b*, another adaptive gain $\lambda$ is adjusted based on the vehicle driving conditions. Those two gains are used to assemble the two independent characterizations of the lateral velocity dynamics (17) and (20) together with a linear lateral velocity so as to obtain the dynamics shown in (66). The digital implementation of the solution for (66) is performed in step 326*c*, *d* and *e*, which are summarized in (67). Notice that $\rho$ and $\lambda$ play important roles here for (67) to achieve robust computation. For example, when the vehicle is driven at its linear dynamics range, the linear lateral velocity is a good indication of the true lateral velocity, hence the gain $\lambda$ will be picked at its maximum value. That is, the computation in (43) will most likely to converge to the linear lateral velocity.

The details of step 328 are further described in FIG. 17. In step 328*a*, the first set of global roll and pitch angles are computed, which can accurately characterize the true vehicle attitudes during steady state driving conditions. Such computations use the formula in (7), i.e., uses the algebraic relationship among the roll, pitch and yaw angular rates. In step 328*b*, the second set of global roll and pitch angles are computed using the formula in (9), i.e., they use the accelerations together with the computed variables such as the linear lateral velocity, the longitudinal velocity and yaw angular rate. Such computations may only characterize the vehicle's true attitudes when the vehicle is driven in its linear dynamics range. In step 328*c*, the reference lateral velocity and the second set of attitudes are used together to compute the so-called reference attitudes using formula (36). The vehicle driving conditions are discriminated in step 328*d* based on a series of functional conditions shown in (35). In step 328*e*, the feedback gains are determined for the attitude errors between the final computation of the vehicle attitudes and the first set of attitudes, the second set of attitudes, and the reference attitudes. Step 328*f* uses those gains to generate a linear combination of the three sets of attitude errors generated in step 328*e* and feed them back to Euler dynamics shown in (63). The final error feedback structures are shown in (64) for roll attitude and in (65) for pitch attitudes. In step 328*g*, the global attitudes are finally calculated based on the digital implementation of (64) and (65).

Figure 18:
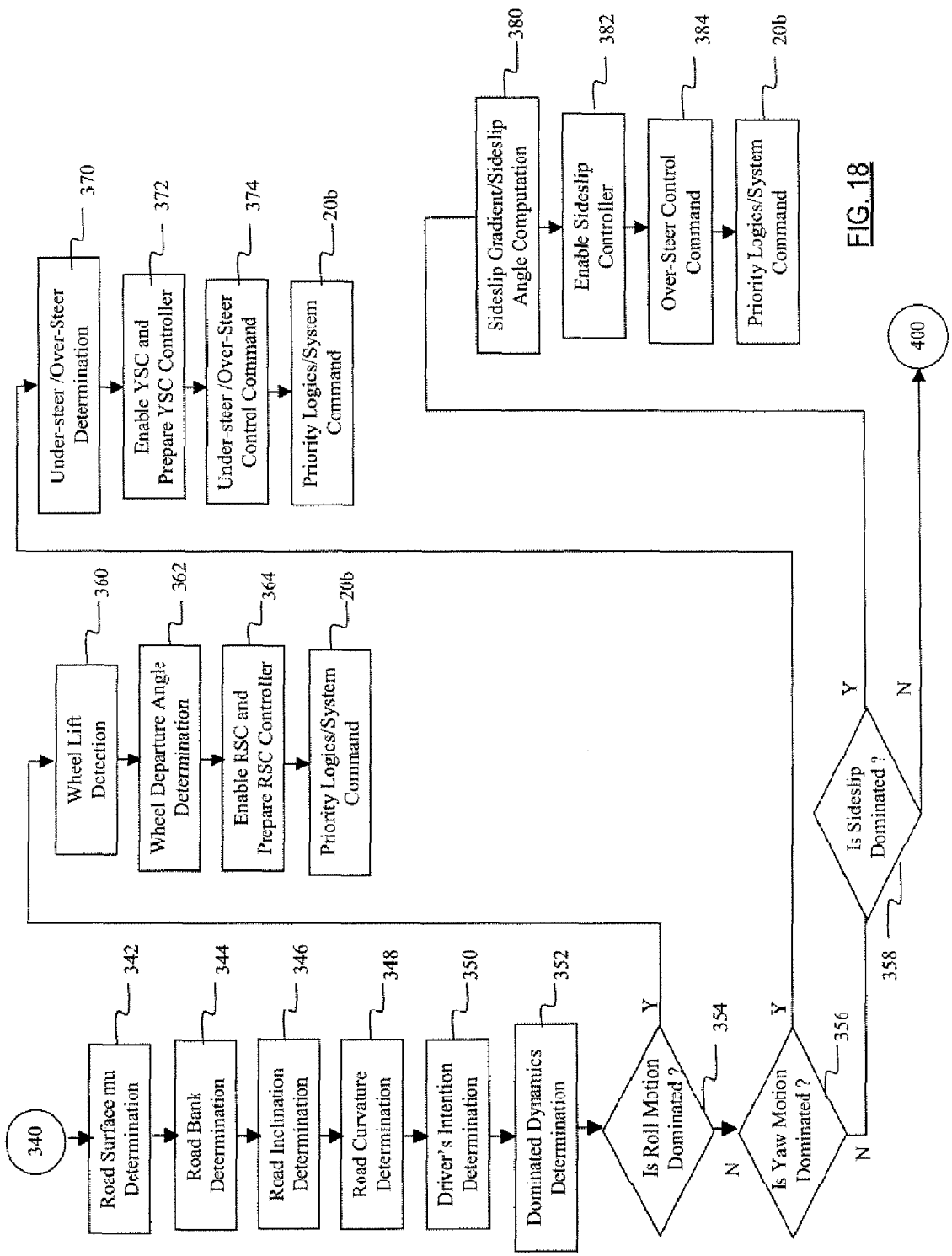
FIG. 18 is a logic flow diagram for a fourth embodiment of the invention.

In FIG. 18, the computation in FIG. 16 continues in step 342 where the road surface mu is determined. The road bank and road inclination are determined in step 344 and 346 respectively. The road curvature is determined in step 348. In step 350, the driver's intent is determined. The dominated vehicle dynamics discrimination is performed in step 352. In step 354, if the roll motion is determined to be a dominated motion direction, the roll stability control will be prepared and performed through wheel lift detection (step 360), wheel departure angle computation (step 362), enabling the RSC controller and preparing the RSC controller (step 364) and command the actuator through priority logic (step 20b). If step 354 shows roll motion is not dominated, then step 356 is conducted where yaw motion is checked for dominance. If the yaw motion is dominated motion, then the yaw stability control is performed through under-steer/over-steer determination (step 370), enable YSC controller and prepare YSC controller (step 372), under-steer/over-steer control command determination, and the final actuator commanding (step 20b).

If in step 356, the yaw motion is not a dominated motion, then the sideslip dominance will be checked in step 358. If there is a large vehicle lateral sliding, the side slip control will be initiated through sideslip and its velocity computation (step 380), enable sideslip controller (step 382), over-steer control command (step 384) and priority logic (step 20b). If the vehicle's sideslip angle and/or its velocity are below some thresholds, step 400 will be performed.

Notice that FIG. 18 only shows a single motion dominance case. Those motions might happen simultaneously and more than one motion may dominate the total vehicle motion. In such cases, it is not hard to find that the thresholds used in checking motion dominance for steps 354, 356 and 358 might need to be a function of the accelerations, roll and yaw rate and vehicle sideslip angle. From this point of view, the aforementioned strategy does not lose its generality. That is, if none are very dominant based on the thresholds, a blending of various controls may be performed. The amount of blending and type of blending may be vehicle specific based on various conditions. For example, a look up table may be determined based on the conditions, the contents of which are determined during the testing phase of the vehicle in much the same way as engines and transmissions are calibrated. One specific blending method is maximum rule. That is, during an RSC event, if the roll characterization, the yaw characterization and sideslip angle are all greater than certain blended thresholds, the brake control pressure at the front outside wheel will be the maximum of the three feedback brake pressures generated for roll stability control, yaw stability control and the sideslip control. RSC control command usually takes the priority over the other functions most of the time. Hence prioritization could be also thought as one of the blending methods used.

Figure 19:
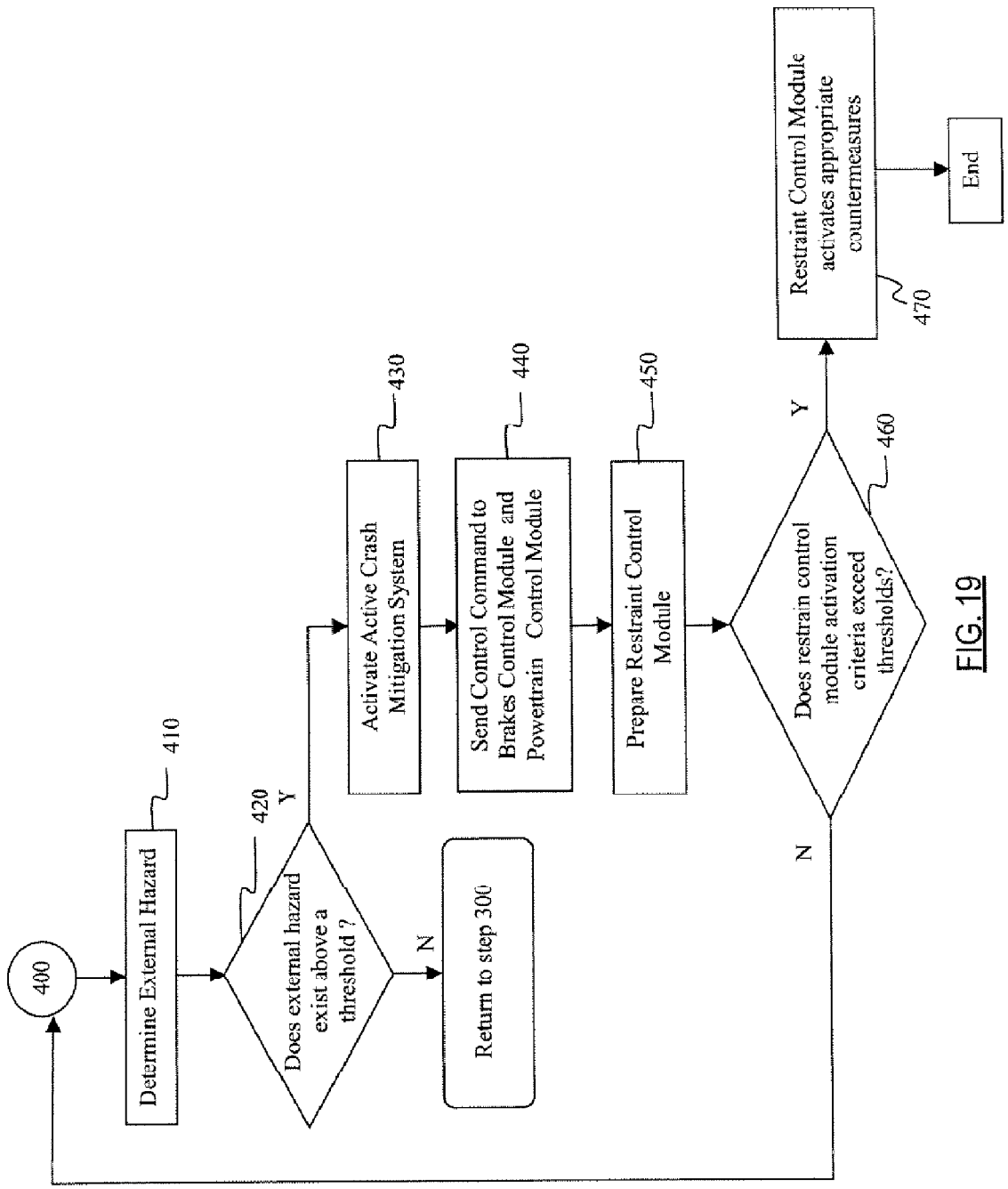
FIG. 19 is a logic flow diagram for activating a restraint control module.

In FIG. 19, step 410 is conducted for determining the external hazard. If the external hazard level is below a threshold at step 420, the process goes back to its starting point at step 300 shown in FIG. 13. Otherwise, step 430 is performed where crash mitigation system is initiated. In step 440, control commands are sent to brake control module and powertrain control module to stop the vehicle. In step 450, the passive safety system, such as the restraint control module, are prepared. If in step 460, the restraint control module determines that the passive safety device activation criteria exceed a series of threshold, the restraint control module will activate appropriate passive safety countermeasures. If the passive safety device activation criteria do not exceed thresholds, step 400 is restarted.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a system in a vehicle having at least one controller, comprising:
generating a pitch rate signal;
generating a lateral acceleration signal;
generating a longitudinal acceleration signal;
generating a yaw rate signal;
generating a roll rate signal;
determining a first global roll angle and a first global pitch angle in response to the roll rate signal, the lateral acceleration signal, the longitudinal acceleration signal and the yaw rate signal;
determining a second global roll angle and a second global pitch angle in response to the pitch rate signal, the lateral acceleration signal, the longitudinal acceleration signal and the yaw rate signal;
combining the first global angle and the second global roll angle to form a final global roll angle;
combining the first global pitch angle and the second global pitch angle to form a final global pitch angle; and
controlling the system in response to the final global roll angle and the final global pitch angle.

2. A method as claimed in claim 1 further comprising:
determining a vehicle lateral velocity;
determining a third global roll angle in response to the second global roll angle and the lateral velocity;
determining a third global pitch angle in response to the second global pitch angle and the vehicle lateral velocity;
combining the first, second and third global roll angles to form the final global roll angle; and
combining the first, second and third global pitch angles to form the final global pitch angle.

3. A method as claimed in claim 1 wherein controlling the system comprises controlling a safety system.

4. A method as claimed in claim 3 wherein controlling a safety system comprises controlling a yaw control system.

5. A method as claimed in claim 3 wherein controlling a safety system comprises controlling a rollover control system.

6. A method as claimed in claim 1 wherein controlling the system comprises actuating braking on the vehicle.

7. A method as claimed in claim 1 wherein controlling the system comprises actuating steering on the vehicle.

8. A method as claimed in claim 1 wherein controlling the system comprises deploying a rollover curtain.

9. A method as claimed in claim 1 wherein controlling the system comprises deploying an airbag.

10. A method of controlling a vehicle system having a least one controller comprising:
determining a dynamic vehicle global roll angle from a roll rate signal and a pitch rate
determining a dynamic vehicle global pitch angle from a roll rate signal and a pitch rate signal;
controlling the system in response to the dynamic vehicle global roll angle and the dynamic vehicle global pitch angle.

11. A method as claimed in claim 10 wherein controlling the system comprises controlling a safety system.

12. A method as claimed in claim 11 wherein controlling a safety system comprises controlling a yaw control system.

13. A method as claimed in claim 11 wherein controlling a safety system comprises controlling a rollover control system.

14. A method as claimed in claim 10 wherein controlling the system comprises actuating braking on the vehicle.

15. A method as claimed in claim 10 wherein controlling the system comprises actuating steering on the vehicle.

16. A method as claimed in claim 10 wherein controlling the system comprises deploying a rollover curtain.

17. A method as claimed in claim 10 further comprising the steps of:
   determining the global roll angle from a vehicle lateral velocity; and
   determining the global pitch angle from a vehicle lateral velocity.

18. A method as claimed in claim 17 wherein controlling the system comprises controlling a safety system.

19. A method as claimed in claim 18 wherein controlling a safety system comprises controlling a yaw control system.

20. A method as claimed in claim 18 wherein controlling a safety system comprises controlling a rollover control system.

21. A method as claimed in claim 17 wherein controlling the system comprises actuating braking on the vehicle.

22. A method as claimed in claim 17 wherein controlling the system comprises actuating steering on the vehicle.

23. A method, as claimed in claim 17 wherein controlling the system comprises deploying a rollover curtain.

* * * * *